United States Patent
Shi et al.

(10) Patent No.: US 12,542,937 B2
(45) Date of Patent: Feb. 3, 2026

(54) INFORMATION PROCESSING METHOD AND APPARATUS, ELECTRONIC DEVICE AND COMPUTER READABLE STORAGE MEDIUM

(71) Applicant: BOE TECHNOLOGY GROUP CO., LTD., Beijing (CN)

(72) Inventors: Qifeng Shi, Beijing (CN); Xiao Chu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 299 days.

(21) Appl. No.: 18/273,151

(22) PCT Filed: Sep. 22, 2022

(86) PCT No.: PCT/CN2022/120543
§ 371 (c)(1),
(2) Date: Jul. 19, 2023

(87) PCT Pub. No.: WO2024/060134
PCT Pub. Date: Mar. 28, 2024

(65) Prior Publication Data
US 2024/0397126 A1  Nov. 28, 2024

(51) Int. Cl.
*H04N 21/235* (2011.01)
*H04N 19/40* (2014.01)
*H04N 21/231* (2011.01)

(52) U.S. Cl.
CPC ......... *H04N 21/2353* (2013.01); *H04N 19/40* (2014.11); *H04N 21/23106* (2013.01)

(58) Field of Classification Search
None
See application file for complete search history.

(56) References Cited

U.S. PATENT DOCUMENTS

2010/0097464 A1   4/2010  Volpe
2025/0080780 A1*  3/2025  Brown ............ H04N 21/23439

FOREIGN PATENT DOCUMENTS

| CN | 104104971 B | 12/2018 |
| CN | 109698943 A | 4/2019 |
| CN | 110662100 A | 1/2020 |
| CN | 110740296 A | 1/2020 |
| CN | 112601096 A | 4/2021 |

(Continued)

*Primary Examiner* — Omar S Parra
(74) *Attorney, Agent, or Firm* — Scully, Scott, Murphy & Presser, P.C.

(57) ABSTRACT

An information processing method and apparatus, an electronic device and a computer readable storage medium are provided. The information processing method includes: receiving a first initialization application from a first client and responding to the first initialization application, wherein the first initialization application includes a play parameter of video stream data playable on the first client; receiving a task instruction from the first client after responding to the first initialization application; acquiring first video stream data according to the task instruction; converting the first video stream data into second video stream data such that the second video stream data has the play parameter; and providing the second video stream data to the first client so that the second video stream data is played on the first client.

16 Claims, 8 Drawing Sheets

(56) References Cited

FOREIGN PATENT DOCUMENTS

| | | | |
|---|---|---|---|
| CN | 112911306 | A | 6/2021 |
| CN | 114520925 | A | 5/2022 |
| EP | 2826530 | A2 | 1/2015 |

\* cited by examiner

INFORMATION PROCESSING METHOD AND APPARATUS, ELECTRONIC DEVICE AND COMPUTER READABLE STORAGE MEDIUM

CROSS-REFERENCE TO RELATED APPLICATION

This application is a U.S. National Phase of International Application No. PCT/CN2022/120543, filed on Sep. 22, 2022, the entire disclosure of which is incorporated herein by reference as part of the present application.

TECHNICAL FIELD

Embodiments of the present disclosure relate to an information processing method and apparatus, an electronic device and a computer readable storage medium.

BACKGROUND

With the rapid development of science and technology and economy, audios and videos have gradually become a part of our lives. Streaming media technology has become a mainstream technology of audio and video transmission. The streaming media technology enables viewing and listening while downloading, instead of waiting for the entire audio and video file to be downloaded to your own computer.

SUMMARY

At least an embodiment of the present disclosure provides an information processing method, comprising: receiving a first initialization application from a first client and responding to the first initialization application, wherein the first initialization application comprises a play parameter of video stream data playable on the first client; receiving a task instruction from the first client after responding to the first initialization application; acquiring first video stream data according to the task instruction; converting the first video stream data into second video stream data such that the second video stream data has the play parameter; and providing the second video stream data to the first client so that the second video stream data is played on the first client.

For example, in the information processing method provided by an embodiment of the present disclosure, receiving the first initialization application from the first client and responding to the first initialization application comprise: receiving the first initialization application from the first client; and responding to the first initialization application, creating a worker thread, and enabling an input cache region and an output cache region for the worker thread, wherein the input cache region is configured to store the first video stream data; the worker thread is configured to acquire the first video stream data from the input cache region and process the first video stream data to obtain the second video stream data; and the output cache region is configured to receive the second video stream data provided by the worker thread and provide the second video stream data to the first client.

For example, in the information processing method provided by an embodiment of the present disclosure, acquiring the first video stream data according to the task instruction comprises: determining a manner for acquiring the first video stream data according to the task instruction and acquiring the first video stream data according to the manner.

For example, in the information processing method provided by an embodiment of the present disclosure, determining the acquisition manner for acquiring the first video stream data according to the task instruction and acquiring the first video stream data according to the manner comprise: indicating the acquisition manner as a uniform resource locator (url) manner in response to the task instruction and acquiring a url from the task instruction; acquiring the first video stream data according to the url; and storing the first video stream data in the input cache region.

For example, in the information processing method provided by an embodiment of the present disclosure, determining the acquisition manner for acquiring the first video stream data according to the task instruction and acquiring the first video stream data according to the manner comprise: indicating the acquisition manner as a cache region manner in response to the task instruction and extracting the first video stream data from the task instruction; and storing the first video stream data in the input cache region.

For example, in the information processing method provided by an embodiment of the present disclosure, determining the acquisition manner for acquiring the first video stream data according to the task instruction and acquiring the first video stream data according to the manner comprise: indicating the acquisition manner as a fragmented byte stream manner in response to the task instruction, and sequentially receiving a plurality of task subinstructions provided from the first client, wherein the plurality of task subinstructions comprise different parts of the first video stream data, respectively; and sequentially extracting a video stream data part of the first video stream data from the plurality of task subinstructions, and storing the video stream data part in the input cache region.

For example, in the information processing method provided by an embodiment of the present disclosure, converting the first video stream data into the second video stream data such that the second video stream data has the play parameter comprises: reading, by the worker thread, the first video stream data from the input cache region, and storing the first video stream data in a processing queue of the worker thread; and decoding and encoding, by the worker thread, the first video stream data in the processing queue according to the play parameter to obtain the second video stream data.

For example, in the information processing method provided by an embodiment of the present disclosure, providing the second video stream data to the first client so that the second video stream data is played on the first client comprises: generating encoding information according to an encoding operation performed by the worker thread on the first video stream data: storing the encoding information at a head of a queue of the output cache region such that a first data packet output from the output cache region contains the encoding information; writing the second video stream data into the output cache region; and sequentially providing a plurality of data packets from the output cache region to the first client, wherein the plurality of data packets comprise the encoding information and the second video stream data.

For example, in the information processing method provided by an embodiment of the present disclosure, writing the second video stream data into the output cache region comprises: wrapping basic play information of a key frame in the second video stream data as a wild card box such that the first client parses the wild card box to obtain the basic play information, wherein the wild card box comprises a plurality of randomly generated bytes.

For example, in the information processing method provided by an embodiment of the present disclosure, the worker thread comprises a read lock which is triggered when the input cache region is full, and the worker thread stops reading the first video stream data from the input cache region in response to the read lock being triggered.

For example, in the information processing method provided by an embodiment of the present disclosure, the worker thread further comprises a write lock which is triggered when the output cache region is full, and the worker thread stops writing the second video stream data in the output cache region and stops reading the first video stream data from the input cache region in response to the write lock being triggered.

For example, in the information processing method provided by an embodiment of the present disclosure, the method further comprises: acquiring a read speed at which the first video stream data is read into the input cache region; acquiring a transcoding speed at which the worker thread converts the first video stream data into the second video stream data; acquiring a write speed at which the output memory outputs the second video stream data; and determining whether the transcoding speed is greater than the write speed and whether the write speed is greater than the read speed; and adjusting the read speed, the transcoding speed and the write speed in response to the read speed, the transcoding speed and the write speed not satisfying that the transcoding speed is greater than the write speed and that the write speed is greater than the read speed.

For example, in the information processing method provided by an embodiment of the present disclosure, a transcoding bit rate is divided into a plurality of encoding layers with transcoding bit rates decreasing sequentially, and adjusting the read speed, the transcoding speed and the write speed in response to the read speed, the transcoding speed and the write speed not satisfying that the transcoding speed is greater than the write speed and that the write speed is greater than the read speed comprises: adjusting the transcoding bit rate to a transcoding bit rate corresponding to an encoding layer next to a current encoding layer starting from next key frame of the first video stream data, in response to the transcoding speed being smaller than the write speed.

For example, in the information processing method provided by an embodiment of the present disclosure, the method further comprises: acquiring a player instruction from the first client; and controlling a playing state of the second video stream data on the first client according to the player instruction.

For example, in the information processing method provided by an embodiment of the present disclosure, the player instruction comprises at least one of following instructions: a pause playing instruction, a start playing instruction, a multiplied speed playing instruction, an instruction of resetting to an initial state, and a jump instruction.

For example, in the information processing method provided by an embodiment of the present disclosure, the method further comprises: establishing a two-way data channel with the first client before receiving the first initialization application from the first client; and after responding to the first initialization application, establishing a correspondence among the two-way data channel, the output cache region, the input cache region, verification information and the worker thread so as to allow for interaction with the first client according to the correspondence.

For example, in the information processing method provided by an embodiment of the present disclosure, the method further comprises: in response to receiving a second initialization application provided by a second client, acquiring information to be verified from the second initialization application; and in response to the information to be verified being consistent with the verification information, acquiring an output cache region corresponding to the verification information according to the correspondence, and providing the second video stream data from the output cache region to the second client.

For example, in the information processing method provided by an embodiment of the present disclosure, the method further comprises: monitoring the read lock and the write lock of the worker thread by a controller to acquire a read lock event and a write lock event; and providing the read lock event and the write lock event to the first client by the controller.

For example, in the information processing method provided by an embodiment of the present disclosure, the controller provides a message to the worker thread regularly; the method further comprises: clearing away the worker thread in response to not receiving a response of the worker thread to the message within a preset period of time by the controller.

For example, in the information processing method provided by an embodiment of the present disclosure, decoding and encoding, by the worker thread, the first video stream data in the processing queue according to the play parameter to obtain the second video stream data comprise: loading, by the worker thread, the first video stream data in the processing queue to an encoder-decoder; and decoding and encoding, by the encoder-decoder, the first video stream data to obtain the second video stream data.

For example, in the information processing method provided by an embodiment of the present disclosure, the method further comprises: transmitting, by the worker thread, a rollback event to the controller in response to an exception occurring before the first video stream data enters the encoder-decoder; and returning, by the controller, the first video stream data to an input buffer in response to the rollback event.

For example, in the information processing method provided by an embodiment of the present disclosure, the method further comprises: requesting, by the worker thread, the controller to mark the worker thread as a zombie thread in response to an internal processing exception of the encoder-decoder.

For example, in the information processing method provided by an embodiment of the present disclosure, the method further comprises: in response to an exception occurring after the encoder-decoder processes the first video stream data, transmitting, by the worker thread, a packet loss event to the controller, and transmitting, by the controller, a packet loss prompt to the first client.

At least an embodiment of the present disclosure provides an information processing method, comprising: transmitting an initialization application to a server, wherein the initialization application comprises a play parameter of playable video stream data; transmitting a task instruction to the server after the server responds to the initialization application; and receiving second video stream data provided by the server and playing the second video stream data, wherein the second video stream data is obtained by converting, by the server, first video stream data acquired according to the task instruction.

For example, in the information processing method provided by an embodiment of the present disclosure, receiving the second video stream data provided by the server and playing the second video stream data comprise: receiving the second video stream data provided by the server; parsing the second video stream data to acquire basic play information in the second video stream data; and playing the second video stream data according to the basic play information.

At least an embodiment of the present disclosure provides an information processing apparatus, comprising: a first receiving unit, configured to receive a first initialization application from a first client and respond to the first initialization application, wherein the first initialization application comprises a play parameter of video stream data playable on the first client; a second receiving unit, configured to receive a task instruction from the first client after responding to the first initialization application; a instruction acquiring unit, configured to acquire first video stream data according to the task instruction; a converting unit, configured to convert the first video stream data into second video stream data such that the second video stream data has the play parameter; and a providing unit, configured to provide the second video stream data to the first client so that the second video stream data is played on the first client.

At least an embodiment of the present disclosure provides an information processing apparatus, comprising: an application transmitting unit, configured to transmit an initialization application to a server, wherein the initialization application comprises a play parameter of playable video stream data; a instruction transmitting unit, configured to transmit a task instruction to the server after the server responds to the initialization application; and a playing unit, configured to receive second video stream data provided by the server and play the second video stream data, wherein the second video stream data is obtained by converting, by the server, first video stream data acquired according to the task instruction.

At least an embodiment of the present disclosure provides an electronic device, comprising: a processor; and a memory comprising one or more computer program instructions; wherein the one or more computer program instructions are stored in the memory and when executed by the processor, implement the information processing method provided by any one embodiment of the present disclosure.

At least an embodiment of the present disclosure provides a computer readable storage medium, which non-transiently stores computer readable instructions, wherein the computer readable instructions, when executed by a processor, implement the information processing method provided by any one embodiment of the present disclosure.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

Figure 1:
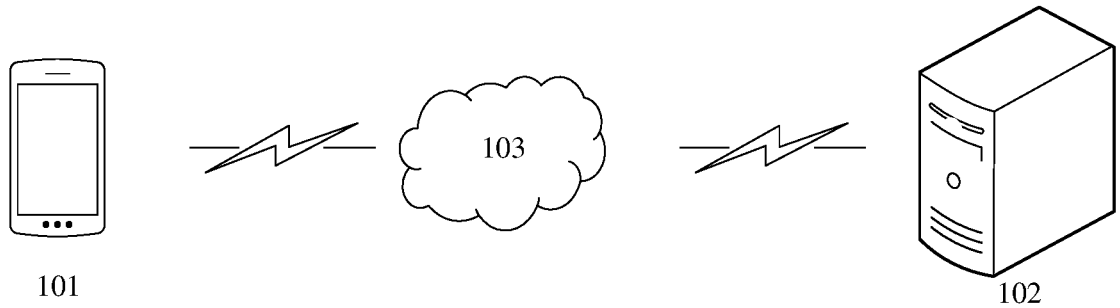
FIG. 1 illustrates a system architecture 100 applied to an information processing method provided by at least one embodiment of the present disclosure.

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

With the streaming media technology having been developed to where it is today, multifarious encoding and decoding techniques have already emerged, such as the most widely used H264, H265 with a high compression ratio, av1 with high cost performance, and MPEG4. In terms of audio, there have been pcm with a high good restoration degree, easy-to-use wav, common mp3, and the like. Each encoding and decoding algorithm has its own unique characteristics and is used in a specific scenario. For different audio and video playing devices, a plurality of wrapping formats are derived, such as avi, mov, mkv, flv, and the most popular mp4.

With multifarious encoding and decoding techniques, users may be confronted with an awkward situation of tough choices because they do not know what formats of videos can be played on terminals or players used by them. Usually, developers of terminal software or hardware need to enumerate all cases and perform normalization processing thereon. Even though a terminal of a user can identify and decode these audios and videos, the cpu and the graphics card of the terminal or the capability of bandwidth may not allow the terminal to play such media streams/files.

For example, in the context of a private network in a park, when an administrator wants to check on a web page an H264 video stream captured by a camera that connects to this network; in consideration of security factors, major browser vendors will prohibit data packet transmission on the web page by the real time streaming protocol (rtsp), and therefore, the administrator cannot check the H264 video stream on the web page because the browser cannot use the rtsp.

For another example, in the above scenario, video streams from the camera are H265 video streams. However, since a terminal of the administrator does not support the playing of H265 videos (e.g., a decoder in the terminal cannot decode the H265 videos), the administrator cannot check the H265 video streams with the terminal.

For another example, many wearable devices are designed with a single chip because they are required to be lightweight and compact, and thus have no CPU and GPU. Therefore, the wearable devices have too weak decoding computing power to decode camera videos and thus cannot be used to quickly check a camera video in a certain orientation.

For another example, in an environment with a poor network (i.e., a weak network environment), a terminal is prone to packet loss, resulting in poor quality of an audio and video played on a terminal and affecting the experience of viewing.

The present disclosure provides another information processing method to address the problem of being difficult in playing a video in the scenarios where a browser is unable to use the protocol, a terminal has no corresponding decoder and the decoding computing power is weak, a network environment is weak and the like as shown in the above examples.

At least one embodiment of the present disclosure provides an information processing method, another information processing method, an apparatus for processing information, another apparatus for processing information, an electronic device and a computer readable storage medium. The information processing method includes: receiving a first initialization application from a first client and responding to the first initialization application, wherein the first initialization application includes a play parameter of video stream data playable on the first client; receiving a task instruction from the first client after responding to the first initialization application; acquiring first video stream data according to the task instruction; converting the first video stream data into second video stream data such that the second video stream data has the play parameter; and providing the second video stream data to the first client so that the second video stream data is played on the first client. The information processing method can alleviate the problem of being difficult in playing an audio and video in a complex encoding and decoding context.

FIG. 1 illustrates a system architecture 100 applied to an information processing method provided by at least one embodiment of the present disclosure.

As shown in FIG. 1, the system architecture 100 may include a terminal device 101, a server 102 and a communication network 103.

A user can use the terminal device 101 to interact with the server 102 via the communication network 103 to receive or transmit messages. The communication network 103 is configured to provide a medium of a communication link between the terminal device 101 and the server 102. The communication network 103 may include various connection types, for example, a wired or wireless communication link, specifically such as WIFI, 3G, 4G, 5G and a fiber-optic cable.

The terminal device 101 may be any electronic device having an audio and/or picture playing function, including but not limited to a smart phone, a tablet computer, a laptop and the like. The terminal device 101 may also be a single chip, soc, a browser, a custom player or the like. The embodiments of the present disclosure do not limit the product type of the terminal device 101, and for example, the terminal device may be based on various available operating systems, such as Windows, Android and IOS. The terminal device 101 may be installed with various applications (APPs), such as an audio and video playing APP, a shopping APP, a web browser APP and an instant messenger, and may download from APP platforms (e.g., Wechat, Alipay) and run applets, fast APPs and the like. For example, a user can play music or a video by means of the audio and video playing APP on the terminal device 101.

Figure 2:
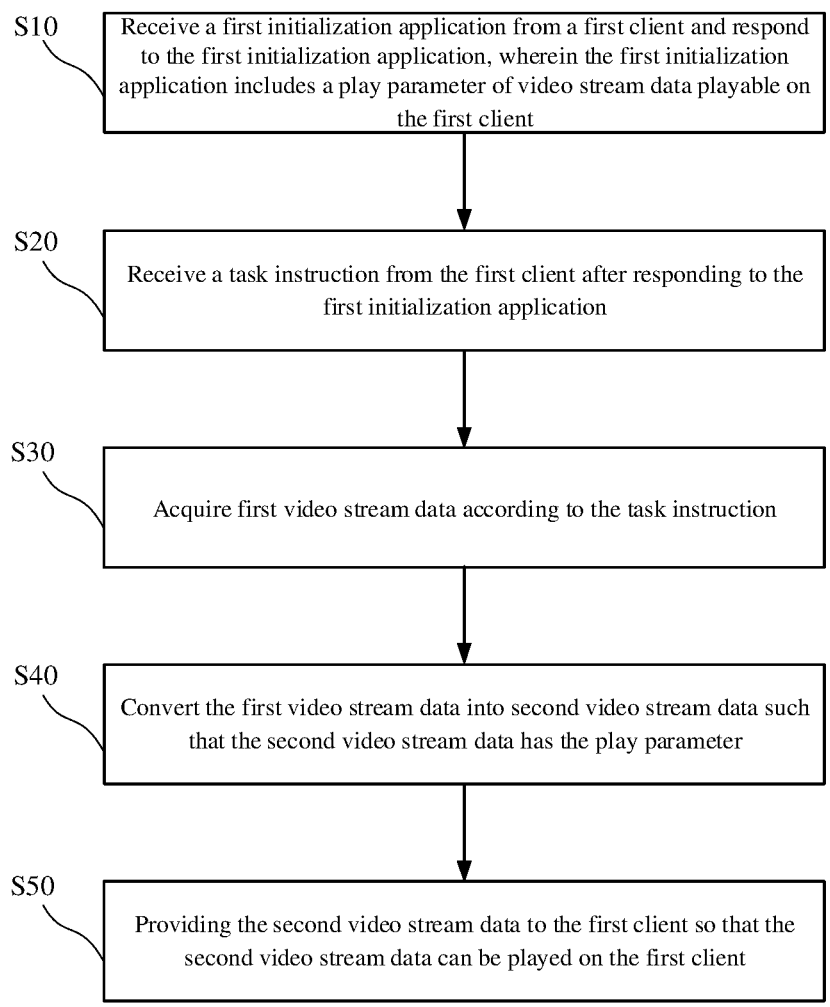
FIG. 2 illustrates a flowchart of an information processing method provided by at least one embodiment of the present disclosure.

The server 102 may be a server that performs an information processing method as shown in FIG. 2 below. The server 102 may be an independent physical server, or a server cluster or a distributed system composed of a plurality of physical servers, or a cloud server, or the like. The server 102 may be, for example, a server with an operating system such as centos, debian and freebsd, and thus can better support an encoder-decoder such as ffmpeg. If the server 102 involves a chip, a software development kit (SDK) may be developed separately to replace the ffmpeg.

FIG. 2 illustrates a flowchart of an information processing method provided by at least one embodiment of the present disclosure.

As shown in FIG. 2, the method may include steps S10-S50.

Step S10: receiving a first initialization application from a first client and responding to the first initialization application, wherein the first initialization application includes a play parameter of video stream data playable on the first client.

Step S20: a task instruction from the first client is received after responding to the first initialization application.

Step S30: acquiring first video stream data according to the task instruction.

Step S40: converting the first video stream data into second video stream data such that the second video stream data has the play parameter.

Step S50: providing the second video stream data to the first client so that the second video stream data is played on the first client.

In the embodiment of the present disclosure, the information processing method shown in FIG. 2 may be performed by the server 102 in FIG. 1. For example, an audio and video to be played on the first client is encoded and decoded by the server 102. Thus, the computing power provided by strong software/hardware of a cloud (i.e., the server) can be used to meet the audio and video playing requirements of most terminals, and a cloud player is realized, solving the problem of being difficult in playing an audio and video in a complex encoding and decoding context.

For step S10, the first client may be, for example, the audio and video playing APP installed on the terminal device 101 in FIG. 1.

For example, the first client transmits the first initialization application to the server 102. The first initialization application includes the play parameter of the video stream data playable on the first client. The play parameter is, for example, a specific required parameter which is supported to be played (high definition or real time) on the first client (e.g., a browser player SDK of the first client). The video stream data is, for example, a data stream that can be read, identified and played by an audio and video player.

In some embodiments of the present disclosure, the first initialization application may also include a instruction type. In the case where the instruction type is a data instruction, the play parameter may be an encoding parameter. The encoding parameter includes, for example, a wrapping format, an encoding and decoding format, an encoding level or the like. In the case where the instruction type is a player instruction, the play parameter may include a playing speed, a playing position to which the audio and video jumps, and the like. The instruction type may also include an encoding and decoding instruction. The play parameter may include, for example, avoption parameter of the ffmpeg, which is used for configuring a decoding strategy and an encoding rule. As explained simply here, the MP4 wrapping format is usually composed of three boxes, including a ftype box for recoding a file type, a moov box for recoding basic play information such as a frame rate, and a mdata box for storing actual media data. The fmp4 is considered as a support for the live streaming capability of the mp4 in MPEG4. The fmp4 is similar to the MP4 and does not need the moov box but putting basic information into moof boxes, and streaming media data is formed in a mode of ftyp+moof+mdata+ moof+mdata. For example, the play parameter includes a play duration parameter frag_duration for representing a play duration of a set of moof+mdata. The play parameter includes an encoding level and a picture quality level. The play parameter may also include an encoding format and the like.

The following Table 1 shows a client instruction set provided by at least one embodiment of the present disclosure. The first initialization application and the task instruction may be generated according to the format of the client instruction set shown in Table 1.

As shown in Table 1, if the first byte of an instruction is 0, it indicates that the instruction is a data instruction. If the second byte of the instruction is 0, the instruction is an initialization application instruction. The initialization application instruction includes json format string including some play parameters. For example, the wrapping format is fmp4, the encoding 5 and decoding format is h264 and the encoding level is 42. If the first byte of an instruction is 1, it indicates that the instruction is a player instruction. If the second byte of the player instruction is 1, the instruction is a start playing instruction.

TABLE 1

| First Byte | Description of First Byte | Second Byte | Description of Second Byte | Following 4 Bytes | Following 8 Bytes | Subsequent Bytes | Following 8 Bytes | PING Data of Last 8 Bytes |
|---|---|---|---|---|---|---|---|---|
| 0 | Data Instruction | 0 | Initialization Task | unsigned int token | unsigned long, Parameter Length | json format string: {type: "fmp4", frag_duration: 4, profile: 64, level: 42, encoder: "h264",} | | unsigned long |
| | | 1 | Direct url pull | unsigned int token | unsigned long, a url length | actual characters of url | | unsigned long |
| | | 2 | Providing a byte stream by a client | unsigned int token | unsigned long, a byte stream length | actual characters of the byte stream | | unsigned long |
| | | 3 | Transmitting byte stream parts | unsigned int token | unsigned long, a byte stream length | actual characters of the byte stream | unsigned long chrunk serial number | unsigned long |

TABLE 1-continued

| First Byte | Description of First Byte | Second Byte | Description of Second Byte | Following 4 Bytes | Following 8 Bytes | Subsequent Bytes | Following 8 Bytes | PING Data of Last 8 Bytes |
|---|---|---|---|---|---|---|---|---|
| | | | | unsigned int token | if 8 unsigned long bytes are FF FF FF FF FF FF FF FF, it indicates ending of the stream. | | | unsigned long |
| | | 4 | Registered multicast | unsigned int token | | | | unsigned long |
| | | FF | Task destroyed | unsigned int token | | | | unsigned long |
| 1 | Player Instruction | 0 | Reset to an initial state | unsigned int token | | | | unsigned long |
| | | 1 | Start playing | unsigned int token | | | | unsigned long |
| | | 2 | Pause | unsigned int token | | | | unsigned long |
| | | 3 | Restore | unsigned int token | | | | unsigned long |
| | | 4 | Seek | unsigned int token | unsigned long, time to seek, starting from 0, in units of seconds | | | unsigned long |
| | | 5 | Play at a multiplied speed | unsigned int token | a multiple of a playing speed, and maximum 32 times supported | | | |
| | | FF | Stop | unsigned int token | | | | unsigned long |

For example, the server 102 in FIG. 1 receives the first initialization application transmitted by the terminal device 101 and responds to the first initialization application.

In some embodiments of the present disclosure, step S10 may include: receiving the first initialization application from the first client; responding to the first initialization application, creating a worker thread, and enabling an input cache region and an output cache region for the worker thread. The input cache region is configured to store the first video stream data. The worker thread is configured to acquire the first video stream data from the input cache region and process the first video stream data to obtain the second video stream data. The output cache region is configured to receive the second video stream data provided by the worker thread and provide the second video stream data to the first client.

For example, responding to the first initialization application is made and the worker thread is started, and two heap memories are enabled and shared to the worker thread. One of the two heap memories serves as the input cache region, and the other one serves as the output cache region. For example, responding to the first initialization application may also include initializing, by the worker thread, a working script of an encoder-decoder (e.g., the ffmpeg) according to initialization data, creating output and trunking processing units and then waiting for a heap memory to read data. Subsequently, the worker thread will keep trying to read data from the heap memory. At this point, the initialization process is completed.

In some embodiments of the present disclosure, the server includes a controller configured to start the worker thread, and enable and share two heap memories to the worker thread.

For step S20, for example, the first client transmits the task instruction to the server after receiving information about the completion of the initialization application from the server.

The task instruction may be, for example, an instruction of requesting to play a video. The task instruction may include an acquisition manner for a first video data stream, a byte length of the first video data stream, etc.

For example, in the architecture shown in FIG. 1, the server 102 receives the task instruction from the terminal device.

For step S30, the first video stream data is, for example, a video or a picture captured by a camera in a park. For example, a large screen terminal in a monitoring room of the park requests as the first client to play a video stream captured by the camera.

The first video stream data may also, for example, come from a third party, e.g., a live streaming video stream of a user.

For step S30, for example, a manner for acquiring the first video stream data is determined according to the task instruction and the first video stream data is acquired according to the manner.

In some embodiments of the present disclosure, determining the acquisition manner for acquiring the first video stream data according to the task instruction and acquiring the first video stream data according to the manner include: indicating the acquisition manner as a uniform resource locator (url) manner in response to the task instruction and acquiring a url from the task instruction; acquiring the first video stream data according to the url; and storing the first video stream data in the input cache region.

In this embodiment, the url is directly proxied to the software development kit of the encoder-decoder (e.g., ffmpeg sdk), and a series of tool kits in the ffmpeg may process the url. For example, the server accesses the url to obtain the first video stream data. The method of using the url to acquire the first video stream data is simple and direct, and easy to implement.

In some other embodiments of the present disclosure, determining the acquisition manner for acquiring the first video stream data according to the task instruction and acquiring the first video stream data in the manner include: indicating the acquisition manner as a buffer manner in response to the task instruction and extracting the first video stream data from the task instruction; and storing the first video stream data in the input cache region.

This embodiment is applicable within a wide range and highly flexible, and applies to a case where a cloud player (i.e., a server) cannot directly access a multimedia source. For example, in the case where the cloud player cannot directly access the multimedia source, the first client autonomously wraps and transmits audio and video data to the cloud. For example, if a first client checks an H264 video stream captured by the camera, but the cloud player cannot access the H264 video stream captured by the camera, the first client autonomously wraps audio and video data to obtain a cache region byte stream and transmits the cache region byte stream to the cloud player. In some embodiments of the present disclosure, the audio and video data may be directly wrapped into the task instruction. Thus, the cloud player directly reads the cache region byte stream in the task instruction to obtain the first video stream data and stores the first video stream data in the input cache region.

In some embodiments of the present disclosure, for example, the worker thread reads data in an internal cache after obtaining this type of task instruction, and autonomously realize a read method of CUSTOM_IO. CUSTOM_IO is an input-output processor of the ffmpeg and is configured for a user to customize a read performing process.

In some other embodiments of the present disclosure, determining the acquisition manner for acquiring the first video stream data according to the task instruction and acquiring the first video stream data in the manner include: indicating the acquisition manner as a fragmented byte stream manner in response to the task instruction, and receiving a plurality of task subinstructions provided from the first client in sequence, wherein the plurality of task subinstructions include different parts of the first video stream data, respectively; and extracting video stream data parts of the first video stream data from the plurality of task subinstructions in sequence, and storing the video stream data parts in the input cache region in sequence.

In this embodiment, the first client fragments the first video stream data, i.e., splits the first client fragments into a plurality of task subinstructions and continuously provides the plurality of task subinstructions to the cloud player. Each task subinstruction includes a different fragment, i.e., a different part, of the fragmented first video stream data. The cloud player acquires a fragment of the first video stream data from each task subinstruction and adds the fragment to the input cache region. This embodiment requires to provide a reserved memory space size at the first initialization, or otherwise generate a reserved memory space with a default size (e.g., 1 G). Then, the first client will continuously write data into this memory, and the data may have a serial number. The fragmented video stream data can be well transmitted in real time and thus be more suitable for live streaming.

As shown in Table 1, for example, if the second byte of the data instruction is 1, it indicates that the acquisition manner for the first video stream data is direct url pull. For example, if the second byte of the data instruction is 2, it indicates that a byte stream is provided by a client, i.e., the buffer manner. For example, if the second byte of the data instruction is 3, it indicates that a client provides byte stream parts in sequence, i.e., the fragmented byte stream manner.

Step S40 may include: reading, by the worker thread, the first video stream data from input cache region, and storing the first video stream data in a processing queue of the worker thread; and decoding and encoding, by the worker thread, the first video stream data in the processing queue according to the play parameter to obtain the second video stream data.

When a worker thread fetches data from the input cache region and processes the data, the data will be put into another processing queue. This processing queue is specifically used for storing data to be processed until the worker thread releases a read memory lock, and a read completion event pops up. The worker thread continuously reads data with a smallest serial number from the input cache region, and after reading, erases the data from the input cache region, facilitating subsequent writing in the input cache region.

In an actual situation, since a speed of reading from the input cache region to the processing queue is different from a speed of writing into the output cache region, continuous backlogging may occur in one of the input cache region and the output cache region. For this, a read lock and a write lock are added for the worker thread. When the input cache region is full, the worker thread will be pended until the input cache region decreases to a certain threshold (which may be configured through initialization). When the output cache region is full, the thread will also be pended until the output cache region decreases to a certain threshold (which may be configured through initialization). When the worker thread is pended, the controller may continuously transmit state data to the first client. The state data may include, for example, a state (e.g., read lock locked, read lock released, write lock locked, write lock released, or a system exception) of the worker thread.

For step S40, for example, the worker thread searches for a suitable encoder for encoding in the ffmpeg according to an encoding and decoding parameter in the initialization application. In some embodiments of the present disclosure, in the event that the server supports hardware acceleration, any common encoder may find a hardware acceleration version encoder corresponding to registration in a database. For example, the hardware acceleration version encoder corresponding to an h264 encoder is nvenc_h264 encoder, and the hardware acceleration encoder corresponding to an h265 encoder is hevc_nvenc encoder.

In some embodiments of the present disclosure, for example, the server may store a correspondence table of encoders and hardware acceleration encoders. Thus, a hardware acceleration encoder may be found according to the correspondence table so that an encoding and decoding speed can be increased by means of the hardware acceleration encoder.

For example, a user may input a desired target encoder at a client. For example, the target encoder is the h264 encoder. The server looks up in the correspondence table according to the target encoder provided by the client to determine whether a hardware acceleration encoder corresponding to the target encoder exists. If the hardware acceleration encoder exists, the hardware acceleration encoder is used to encode and decode the first video stream data to increase a response speed.

In some embodiments of the present disclosure, if the user does not input a specified target encoder at the client, a default encoder is provided to the server such that the server looks up in the correspondence table to determine whether a hardware acceleration encoder corresponding to the default encoder exists.

In some embodiments of the present disclosure, decoding and encoding, by the worker thread, the first video stream data in the processing queue according to the play parameter to obtain the second video stream data include: loading, by the worker thread, the first video stream data in the processing queue to an encoder-decoder; and decoding and encoding, by the encoder-decoder, the first video stream data to obtain the second video stream data.

For example, in some embodiments of the present disclosure, the encoder-decoder may be, for example, an ffmep encoder-decoder. For example, the server includes an ffmpeg SDK. The ffmpeg SDK enables a plurality of encoding and decoding functions, such as hardware acceleration, h264 encoding and decoding, and h265 encoding and decoding. The ffmpeg may also include an instruction set acceleration and multithread lib packet.

For example, the worker thread may use the ffmpeg SDK to encode and decode the first video stream data in the processing queue.

In some embodiments of the present disclosure, the information processing method may further include: transmitting, by the worker thread, a rollback event to the controller in response to an exception occurring before the first video stream data enters the encoder-decoder; and returning, by the controller, the first video stream data to the input cache region in response to the rollback event.

Assuming that an error is reported before the first video stream data enters the ffmpeg for various reasons such as memory overflow, the worker thread throws the rollback event. The controller may return the data in the processing queue to the input cache region, and the worker thread pulls a read cursor back to a previous position to reset the state.

In some embodiments of the present disclosure, there is a frame sequence within the ffmpeg, leading to irreversible data. Therefore, data before entering an ffmpeg reader may be rolled back, and data from a decoder can only enter the output cache region after being encoded (the data is not encoded if it is not set by the user and transmitted in the form of raw yuv frame/pcm sample). Therefore, when data of the input cache region is read on the worker thread, a cursor position is used as a data identifier.

By setting the rollback event, the first video stream data can be returned to the input cache region. Thus, the correct first video stream data may be read from the input cache region again, guaranteeing the correctness of the first video stream data and improving the correctness of encoding and decoding.

In some embodiments of the present disclosure, the information processing method may further include: requesting, by the worker thread, the controller to mark the worker thread as a zombie thread in response to an internal processing exception of the encoder-decoder.

For example, if an error is reported within the ffmpeg decoder/encoder for various reasons such as a disordered packet sequence, the worker thread may throw a suicide event, requesting the controller to mark the worker thread as the zombie thread.

After a thread marked as the zombie thread by the controller is killed by the controller, all related data for the thread is cleared away from the input cache region, the processing queue and the output cache region. After the terminal is informed of a destroying event, a key-value pair is cleared away, and connection is interrupted and a socket connection handle is destroyed.

In some embodiments of the present disclosure, the information processing method may further include: in response to an exception occurring after the encoder-decoder processes the first video stream data, transmitting, by the worker thread, a packet loss event to the controller, and transmitting, by the controller, a packet loss prompt to the first client.

For example, if an error is reported after the data comes out of the ffmpeg encoder for various reasons such as a system exception, the worker thread may throw the packet loss event, requesting the controller to inform the terminal of the event. According to this embodiment, the first client can be informed of packet loss timely and allowed to process the packet loss event timely to guarantee the attainability and correctness of the first video stream data.

Figure 3A:
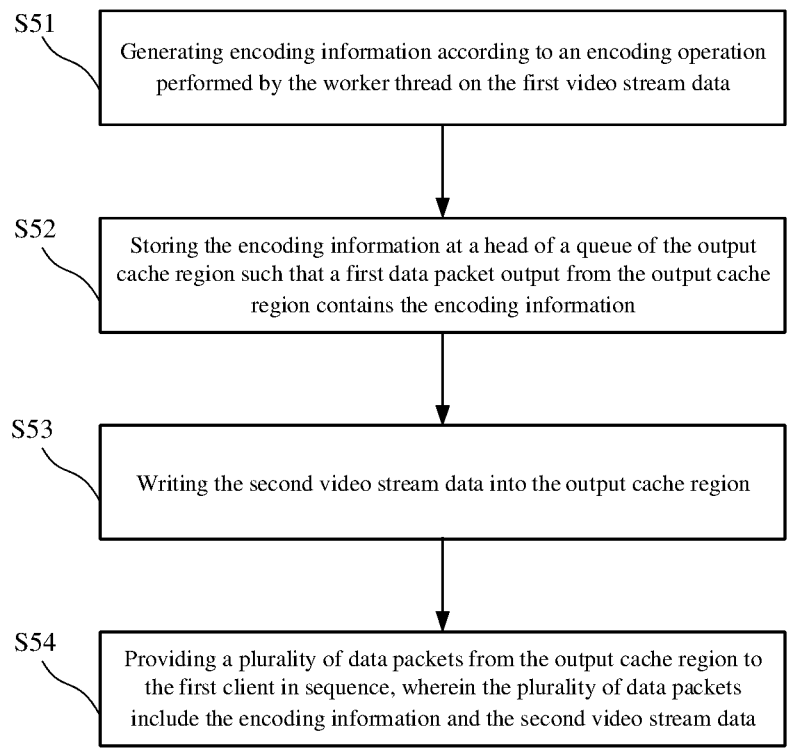
FIG. 3A illustrates a flowchart of a method of S50 in FIG. 2 provided by at least one embodiment of the present disclosure.

FIG. 3A illustrates a flowchart of a method of S50 in FIG. 2 provided by at least one embodiment of the present disclosure.

As shown in FIG. 3A, step S50 may include steps S51-S54.

Step S51: generating encoding information according to an encoding operation performed by the worker thread on the first video stream data.

Step S52: storing the encoding information at a head of a queue of the output cache region such that a first data packet output from the output cache region contains the encoding information.

Step S53: writing the second video stream data into the output cache region.

Step S54: providing a plurality of data packets from the output cache region to the first client in sequence, wherein the plurality of data packets include the encoding information and the second video stream data.

For step S51, the worker thread demultiplexes the first video stream data to obtain encoding information, e.g., an encoding level (profile), a level, a sequence parameter set (SPS), a picture parameter set (PPS) constrain_set_flag (sps, pps information).

For step S52, the encoding information is stored at the head of the queue of the output cache region, and the encoding information cannot be erased before the worker thread is destroyed. Thus, any client may get the encoding information when requesting to access the second video stream data, allowing for local initialization preparation or optimization for decoding at the client. Therefore, in this embodiment, the first data packet of a message returned by the cloud player to the first client or other client includes the encoding information. In the present disclosure, a packet containing the encoding information is called a codec packet.

For step S53, for example, the worker thread continuously encodes and decodes the fragmented first video stream data, and continuously writes the second video stream data after encoding and decoding in the output cache region.

In some embodiments of the present disclosure, step S53 may include: wrapping basic play information of a key frame in the second video stream data as a wild card box such that the first client parses the wild card box to obtain the basic play information. The wild card box includes a plurality of randomly generated bytes.

The security of downlink data can be improved by wrapping the basic play information of the key frame in the second video stream data as the wild card box. That is, any third party cannot decode the video stream without making a request to the cloud. In the present disclosure, the wild card box is encoded in a hybrid mode. That is, in case of a packet containing a key frame, the basic play information is wrapped as a confusion packet (wild card, WC), or otherwise transmitted normally. The WC box contains essential data information and is used for I-frame generation in coordination with a client. Due to the particularity of the key frame, if there is lack of the key frame for other reference frames, screen blurring may be caused.

In some embodiments of the present disclosure, since the WC box needs to be parsed in coordination with the client to obtain the basic play information, the basic play information of the key frame in the second video stream data is wrapped as the WC box which may be present in the form of a pluggable plug-in, i.e., configurable.

The WC box a kind of confusion packet which is different from other mp4 boxes, in which first 4 bytes are string flag bits wc, second 8 bytes are a token (which is an unsigned int token of 8 bytes obtained when the socket is established), and following 8 bytes are a random length value, followed closely by the number of specific bytes of the random length where numerous randomly generated bytes are stored for confusion. After this, it is a true moof box, including a specific subbox mfhd and the like. However, the clients need to construct their own container boxes (traf) such as moof and track fragment.

In some other embodiments of the present disclosure, for example, for fmp4, basic information is put into moof boxes, and streaming media data is formed in a mode of ftyp+moof+mdata+moof+mdata. Therefore, the basic play information of the key frame in the second video stream data may be wrapped as a moof box.

For step S54, for example, a plurality of data packets are provided from the output cache region to the first client in sequence, wherein the plurality of data packets include a codec packet and a plurality of data packets corresponding to the second video stream data.

In some embodiments of the present disclosure, the worker thread includes a read lock which is triggered when the input cache region is full, and in response to the read lock being triggered, the worker thread stops reading the first video stream data from the input cache region.

In some embodiments of the present disclosure, the worker thread further includes a write lock which is triggered when the output cache region is full, and in response to the write lock being triggered, the worker thread stops writing the second video stream data in the output cache region and stops reading the first video stream data from the input cache region.

For example, the read lock is triggered when the input cache region is full, thereby stopping reading the first video stream data, and the client may receive information of the read lock provided by the server. The write lock is triggered when the output cache region is full, and the encoder-decoder in the worker thread is pended, thereby stopping writing and also stopping reading the first video stream data in the input cache region.

The read lock and the write lock are provided so that behaviors can be isolated, and can also guarantee that video streams to the cloud can be encoded and decoded and transmitted most rapidly.

In some embodiments of the present disclosure, the information processing method further includes: acquiring a read speed Vr at which the first video stream data is read into the input cache region; acquiring a transcoding speed Vd at which the worker thread converts the first video stream data into the second video stream data; acquiring a write speed Vw at which the output memory outputs the second video stream data; and determining whether the transcoding speed Vd is greater than the write speed Vw and whether the write speed Vw is greater than the read speed Vr; and adjusting the read speed Vr, the transcoding speed Vd and the write speed Vw in response to the read speed Vr, the transcoding speed Vd and the write speed Vw not satisfying that the transcoding speed Vd is greater than the write speed Vw and that the write speed Vw is greater than the read speed.

In some embodiments of the present disclosure, mainly in the scenario of live streaming, a fragmented byte stream lock is determined as follows: Vr=IO Read (Websocket) KBPS/Input Stream BitRate; Vw-IO Write (Websocket) KBPS/Output Stream BitRate; and Vd=Decoder (Worker) Read KBPS/Input Stream BitRate. IO Read (Websocket) KBPS represents a read speed of the websocket; Input Stream BitRate represents bit rate information in an input stream information header; IO Write (Websocket) KBPS represents a write speed of the websocket; Output Stream BitRate represents bit rate information in an output stream information header; and Decoder (Worker) Read KBPS represents a decoding speed.

The following Table 2 shows a correspondence of a read speed Vr, a transcoding speed Vd and a write speed Vw to a lock event provided by at least one embodiment of the present disclosure.

TABLE 2

| Vr | Vd | Vw | Lock Event | Variable Bit Rate (VBR) | Remarks |
|----|----|----|------------|-------------------------|---------|
| 3 | 1 | 2 | Null | It does not need to decrease. | The decoder operates most fast, and the write speed is greater than the read speed, with no lock. |
| 2 | 1 | 3 | The write lock is triggered. | It does not change. | The decoder operates most fast; the read speed is greater than the write speed, and the decoding speed is greater than the read speed; the write lock is locked frequently; however, the write speed cannot be improved by changing parameters, and therefore, the VBR does not change. |

TABLE 2-continued

| Vr | Vd | Vw | Lock Event | Variable Bit Rate (VBR) | Remarks |
|---|---|---|---|---|---|
| 3 | 2 | 1 | Null | The bit rate may be decreased (i.e., the transcoding speed is reduced), and the bit rate cannot be increased. | Write is the fastest, followed by the decoder, and read is the slowest; the write speed is greater than the read speed, and the decoding speed is greater than the read speed, and therefore, there is no lock. |
| 1 | 2 | 3 | The read lock is triggered. | The bit rate may be decreased, and the bit rate cannot be increased. | Read is the fastest, followed by the decoder, and write is the slowest; the read speed is greater than the write speed, and the decoding speed is less than the read speed; the read lock is triggered frequently; a decrease in bit rate is helpful to increase the decoding speed, ameliorating lag. |
| 1 | 3 | 2 | The read lock is triggered. | The bit rate may be decreased, and the bit rate cannot be increased. | Read is the fastest, followed by write, and the decoder is the slowest; the read speed is greater than the write speed, and the decoding speed is less than the read speed; the read lock is triggered frequently; a decrease in bit rate is helpful to increase the decoding speed, playing a limited role in ameliorating lag. |
| 2 | 3 | 1 | The read lock is triggered. | The bit rate may be decreased, and the bit rate cannot be increased. | Write is the fastest, followed by read, and the decoder is the slowest; the read speed is greater than the write speed, and the decoding speed is less than the read speed; the read lock is triggered frequently; a decrease in bit rate is helpful to increase the decoding speed, ameliorating and even eliminating lag. |

As shown in Table 2, if Vr=3, Vd=1 and Vw=2, the write speed is greater than the read speed, and neither the read lock nor the write lock is triggered, with no need to reduce the transcoding speed. When reading, writing and decoding, the worker thread may count incoming and outgoing bytes, need to determine whether the read and write locks are enabled/released according to the left of the table at intervals of several hundred milliseconds, and enable counting again.

In an embodiment of the present disclosure, the sequence of the read speed, the transcoding speed and the write speed is Vd>Vw>Vr, and this can guarantee that video streams to the cloud player can be encoded and decoded and transmitted most rapidly. Otherwise, there may be a backlog of data at one side, resulting in a locking phenomenon. In case of the read lock, it indicates that the write process or the decoding process is relatively slow. If the primary cause is a problem of the decoder, the decoder may dynamically alter an encoding and decoding speed (i.e., the bit rate) of the worker thread to ameliorate or solve the problem.

In some embodiments of the present disclosure, the transcoding speed is divided into a plurality of encoding layers with transcoding speeds decreasing in sequence, and adjusting the read speed, the transcoding speed and the write speed in response to the read speed, the transcoding speed and the write speed not satisfying that the transcoding speed is greater than the write speed and that the write speed is greater than the read speed includes: in response to the transcoding speed being smaller than the write speed, starting from next key frame of the first video stream data, adjusting a current transcoding bit rate to a transcoding bit rate corresponding to an encoding layer next to the encoding layer in which the current transcoding bit rate lies. For example, if the transcoding speed is still lower than the write speed after the transcoding bit rate is decreased by one encoding layer, the transcoding bit rate is further decreased by one encoding layer. That is, in this embodiment, the transcoding bit rate may be decreased step by step in a descending order, thereby increasing the transcoding speed and allowing for smoother transcoding.

In the event that the write speed is lower than the read speed, a read lock exception event is returned and a packet of new first video stream (input stream) data is not received. In this case, when the first client receives the read lock exception event, it is necessary to locally cache or drop a data packet which is about to be transmitted.

In some embodiments of the present disclosure, dynamically altering the bit rate of the worker thread may be enabled through configuration of an initialization parameter. For example, at initialization, N encoding layers are prepared downwards from the bit rate of the current input stream as an origin, with the bit rate of each layer equal to an original bit rate$\times 4^{-N}$. In the case where the input cache region is full, a read lock counter (RC) increments by 1. In the case where RC is greater than a threshold, starting from next key frame, the bit rate is adjusted downwards by one layer, and the RC is rest. Thus, it is switched to next layer, and a new output stream is generated.

Figure 3B:
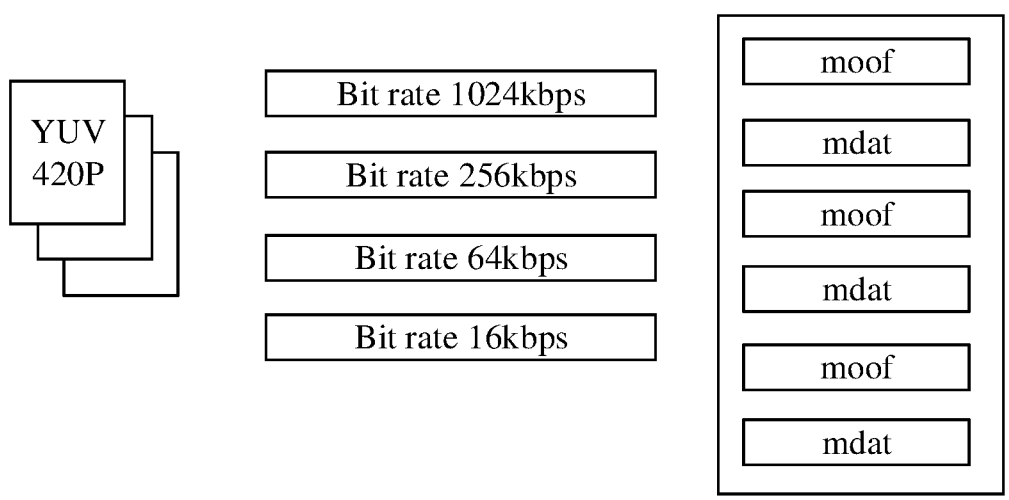
FIG. 3B illustrates a diagram of an example of a plurality of encoding layers provided by at least one embodiment of the present disclosure.

FIG. 3B illustrates a diagram of an example of a plurality of encoding layers provided by at least one embodiment of the present disclosure.

As shown in FIG. 3B, for example, when the worker thread is initialized, 4 encoding layers may be prepared: an encoding layer with a bit rate of 1024 kbps, an encoding layer with a bit rate of 256 kbps, an encoding layer with a bit rate of 64 kbps, and an encoding layer with a bit rate of 16 kbps.

For example, in FIG. 3B, the worker thread may encode the second video stream information into YUV420 format with a bit rate selected from 1024 kbps, 256 kbps, 64 kbps and 16 kbps. When the input cache region is full, the bit rate may be adjusted from 1024 kbps to 256 kbps.

Figure 4:
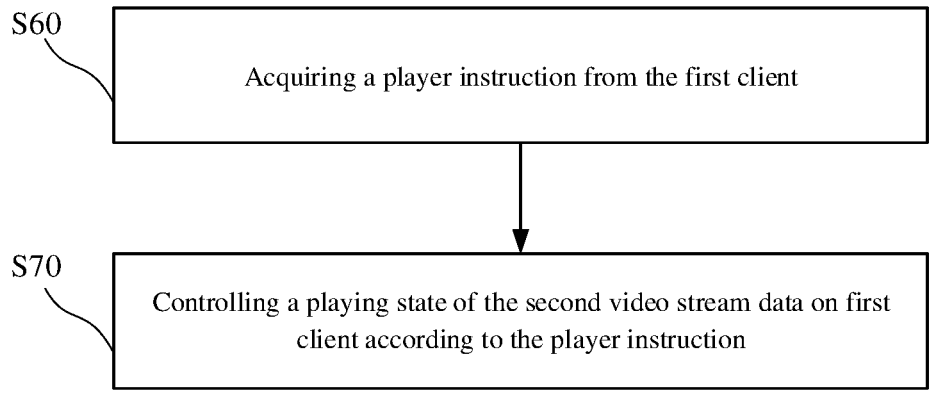
FIG. 4 illustrates a flowchart of another information processing method provided by at least one embodiment of the present disclosure.

FIG. 4 illustrates a flowchart of another information processing method provided by at least one embodiment of the present disclosure.

As shown in FIG. 4, the information processing method may further include step S60 and step S70 in addition to the steps S10-S50 shown in FIG. 2. Step S60 and step S70 may be performed, for example, after step S50.

Step S60: acquiring a player instruction from the first client.

Step S70: controlling a playing state of the second video stream data on first client according to the player instruction.

This method enables a user to control the played second video stream data by means of the first client, e.g., control a playing speed of the second video stream data, control pausing playing or control starting playing. Thus, the functions of the cloud player can be further perfected.

For step S60, the player instruction includes at least one of the following instructions: a pause playing instruction, a start playing instruction, a multiplied speed playing instruction, an instruction of resetting to an initial state, and a jump instruction.

The pause playing instruction is used for controlling the second video stream data to pause playing; the start playing instruction is used for controlling the second video stream data to start playing; the multiplied speed playing instruction is used for adjusting the playing speed of the second video stream data; the instruction of resetting to an initial state is used for controlling the second video stream data to return to an initial time; and the jump instruction is used for controlling the second video stream data to jump to a video playing position so as to start playing from the video playing position.

In an embodiment of the present disclosure, for example, the player instruction includes a plurality of bytes. If the first byte is 1, it indicates that the instruction is the player instruction. In the event that the first byte is 1, the second byte indicates a specific play instruction. For example, if the second byte is 0, it indicates that the player instruction is to reset to an initial state; if the second byte is 1, it indicates that the player instruction is to start playing; if the second byte is 2, it indicates that the player instruction is to pause, and so on. What player instruction is indicated by a value of the second byte can be set by a person skilled in the art.

For step S70, for example, the server responds to the player instruction to control a state of the second video stream data on the first client, such as a playing speed, pause and start.

Figure 5:
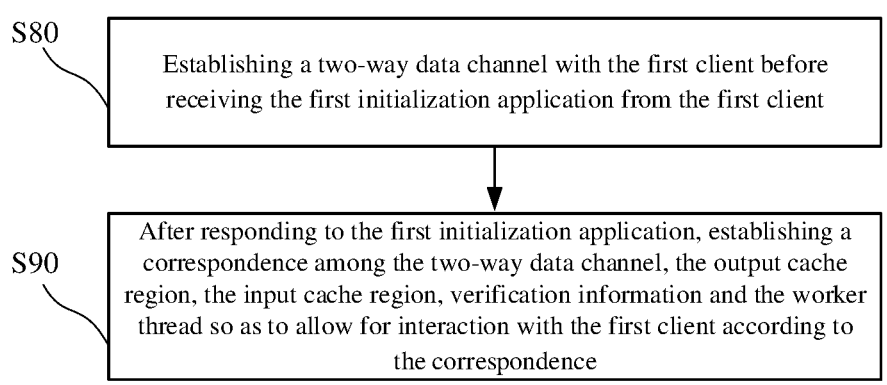
FIG. 5 illustrates a flowchart of another information processing method provided by at least one embodiment of the present disclosure.

FIG. 5 illustrates a flowchart of another information processing method provided by at least one embodiment of the present disclosure.

As shown in FIG. 5, the information processing method may further include step S80 and step S90 in addition to the steps S10-S50 shown in FIG. 2. Step S80 may be performed, for example, before step S10.

Step S80: establishing a two-way data channel with the first client before receiving the first initialization application from the first client.

Step S90: after responding to the first initialization application, establishing a correspondence among the two-way data channel, the output cache region, the input cache region, verification information and the worker thread so as to allow for interaction with the first client according to the correspondence.

For step S80, the two-way data channel may be, for example, a websocket based data channel. The first client is in two-way communication with the server through the websocket.

In some embodiments of the present disclosure, in consideration of the uncertainty of arrival over a network, and since the websocket is tcp, the sequence of which may be disordered in the case of high concurrency, an ACK mechanism similar to a tcp handshake is added in the embodiments of the present disclosure. In other words, every time an instruction is sent, unique PING data is generated with a cicrosecond timestamp (the default is that the number of online users does not exceed 1000000; and if there are more online users, it may be considered that other methods such as a snowflake algorithm are used to generate the PING data). The controller may receive PONG, as a response, which is responsible for returning a same value on the original instruction. The terminal may confirm whether data arrives according to an accepting state of PONG. If there is no PONG within a period of time, it may be considered that a data packet is retransmitted. The cloud may accept and determine whether the current pointer points to the data packet. If the packet does not arrive, overwriting is performed. If a worker thread is being read or a subsequent data packet has been read, the data is discarded.

For step S90, for example, when the client connects, the controller may get a connection handle. After the client transmits an initialization application, the controller may initialize the memory to enable the input cache region and the output cache region, and create a worker thread, generate verification information token and generate the correspondence among the two-way data channel, the output cache region, the input cache region, the verification information and the worker thread in the worker thread. The correspondence is stored, for example, in the form of a key-value pair.

In some embodiments of the present disclosure, the information processing method may further include: monitoring the read lock and the write lock of the worker thread by the controller to acquire a read lock event and a write lock event; and providing the read lock event and the write lock event to the first client by the controller.

For example, the controller monitors thread lock events simultaneously, delivers a notification to each terminal according to an event, and temporarily pends an input packet/output packet according to a situation of the lock so that the whole system can operate healthily. In addition, the controller may also transmit a message to the worker thread regularly and clear away the worker thread in response to the controller not receiving a response of the worker thread to the message within a preset period of time. For example, a thread having no acknowledgment of receipt within a preset period of time (e.g., 1 minute) may be marked as the zombie thread. For the health of the whole system, the controller may safely clear away the zombie thread and inform a relevant socket handle of releasing resources.

Figure 6:
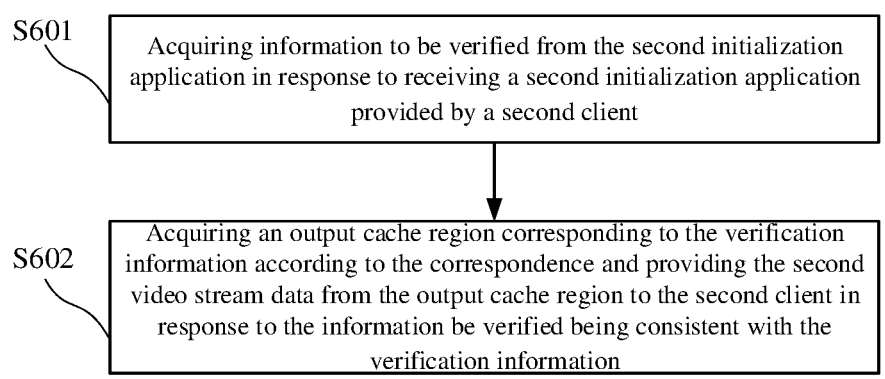
FIG. 6 illustrates a flowchart of another information processing method provided by at least one embodiment of the present disclosure.

FIG. 6 illustrates a flowchart of another information processing method provided by at least one embodiment of the present disclosure.

As shown in FIG. 6, the information processing method may further include step S601 and step S602 in addition to the steps S10-S50 shown in FIG. 2. Step S601 and step S602 may be performed, for example, after step S50.

Step S601: acquiring information to be verified from the second initialization application in response to receiving a second initialization application provided by a second client.

Step S602: acquiring an output cache region corresponding to the verification information according to the correspondence and providing the second video stream data from the output cache region to the second client in response to the information be verified being consistent with the verification information.

For step S601, as shown in FIG. 1, in the system architecture 100, a client 104 may be further included in addition to the first client 101. The client 104 is an example of the second client.

For example, after the client 101 transmits the first initialization application to the server for the first time, the server returns a first message body which contains a token.

The client 101 may share the token with other users (e.g., the client 104) such that the client 104 generates the second initialization application according to the token and transmits the second initialization application to the server.

For example, the token may be shared to other users. Thus, other users can access a video stream transmitted from the server through the token, which is equivalent to video multicast. If there are too many access tokens, a maximum number of multicast connections may be maintained, and service for other token owners is denied. A task initiator has full authority to handle the task.

The server acquires the information to be verified from the second initialization application in response to receiving the second initialization application provided by the client 104.

For step S602, for the information to be verified, the server, in response to the information to be verified being consistent with the verification information, acquires the output cache region corresponding to the verification information according to the correspondence and provides the second video stream data from the output cache region to the second client.

The following Table 3 shows a data set of a server provided by at least one embodiment of the present disclosure. The data provided by the server to the client may be generated in a format shown in Table 3. For example, in the example of Table 3, if the first byte of the data returned by the server to the client is 1, the data is PONG data. If 1-byte status bits in the PONG data are 01, it indicates that the first video stream data has entered the input cache region. For another example, if the first byte of the data returned by the server to the client is 0, it indicates that the data is a data stream. If the second byte of the data stream is 1, the data stream is an event stream. If a 1-byte third-stage class of the event stream is 02, it indicates that the cloud player is paused. If the 1-byte third-stage class is E0, it indicates that the write lock is triggered.

TABLE 3

| First Byte | Description of First Byte | Following 4 Bytes | Following 8 Bytes | Second Byte | Description of Second Byte | 1-Byte Third-Stage Class | Description of Class |
|---|---|---|---|---|---|---|---|
| 0 | Data stream | unsigned int token | Serial No. | 0 | Data stream | 0 | codec packet/index packet |
|  |  |  |  |  |  | 1 | ordinary data packet |
|  |  |  |  |  |  | 2 | wild card (WC) data packet |
|  |  |  |  |  |  | FE | EOF, reconnection is needed. |
|  |  |  |  |  |  | FF | EOF |
|  |  |  |  | 1 | Event stream | 0 | Ready |
|  |  |  |  |  |  | 1 | Normal |
|  |  |  |  |  |  | 2 | Pause |
|  |  |  |  |  |  | 9 | Normal end |
|  |  |  |  |  |  | 10 | Seek interrupt |
|  |  |  |  |  |  | 11 | Seek End |
|  |  |  |  |  |  | D0 | Read lock |
|  |  |  |  |  |  | D1 | Read lock release |
|  |  |  |  |  |  | E0 | The write lock is triggered. |
|  |  |  |  |  |  | E1 | The write lock is released. |
|  |  |  |  |  |  | FF | System exception |

| First Byte | Description of First Byte | Following 4 Bytes | Following 8 Bytes | 1-Byte Status Bits | Description of Byte | 1-Byte Third-Stage Class | Description of Class | 8-Byte Message Length Bits | Return Message |
|---|---|---|---|---|---|---|---|---|---|
| 1 | PONG data | unsigned int token | 8-byte Pong data | 0 | It has arrived, but does not enter the input cache region. | 0 | It does not enter the decoder, and retransmission is needed. | unsigned int | A system exception occurs, and retransmission is needed. |
|  |  |  |  |  |  | FF | Recovery is impossible, and retransmission is needed. |  | A system error occurs, and retransmission is needed. |

TABLE 3-continued

| | | | |
|---|---|---|---|
| | 1 | It has arrived and has entered the input cache region. | unsigned int |
| | FF | An exception occurs. | unsigned int |

Figure 7:
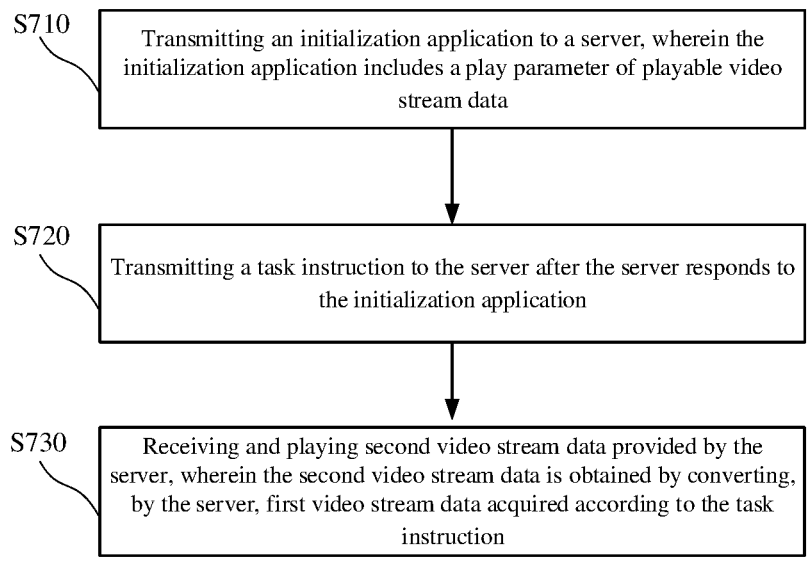
FIG. 7 illustrates a flowchart of another information processing method provided by at least one embodiment of the present disclosure.

FIG. 7 illustrates a flowchart of another information processing method provided by at least one embodiment of the present disclosure.

The information processing method is performed by the client 101 in FIG. 1 or the client 104.

As shown in FIG. 7, the information processing method may include steps S710-S730.

Step S710: transmitting an initialization application to a server, wherein the initialization application includes a play parameter of playable video stream data.

Step S720: transmitting a task instruction to the server after the server responds to the initialization application.

Step S730: receiving and playing second video stream data provided by the server, wherein the second video stream data is obtained by converting, by the server, first video stream data acquired according to the task instruction.

According to the information processing method, an audio and video to be played on a first client is encoded and decoded by the server. Thus, the audio and video playing requirements of most terminals can be met by the computing power provided by strong software/hardware of a cloud (i.e., the server), and a cloud player is realized. The problem of being difficult in playing an audio and video in the context of complex encoding and decoding is solved.

For step S710, for example, the client 101 transmits the initialization application to the server. The initialization application may be, for example, the first initialization application described above. The initialization application is, for example, generated according to the instruction set of the above Table 1.

For another example, the client 104 may also transmit the initialization application to the server after receiving a token shared by the client 101.

For step S720, for example, the task instruction is transmitted to the server after receiving a response provided by the server.

The task instruction may be, for example, a request for the server to provide the second video stream data. Step S720 may be, for example, pulling a stream by the client 101 or the client 104.

The server, in response to receiving the task instruction, performs, for example, steps S30-S50 described above to convert the first video stream data acquired according to the task instruction to obtain the second video stream data.

For step S730, for example, the client 101 receives and plays the second video stream data.

In some embodiments of the present disclosure, step S730 may include: receiving the second video stream data provided by the server; parsing the second video stream data to acquire basic play information in the second video stream data; and playing the second video stream data according to the basic play information.

For example, the second video stream data includes a WC box. The first 4 bytes of the WC box are string flag bits wc, second 8 bytes are a token (which is an unsigned int token of 8 bytes obtained when the socket is established), and following 8 bytes are a random length value, followed closely by the number of specific bytes of the random length where numerous randomly generated bytes are stored for confusion. After this, it is a true moof box, including a specific subpacket mfhd and the like, thereby improving the security.

The clients need to construct their own container boxes (traf) such as moof, track fragment. For example, bytes following mfhd are set as Buf, and a length of the Buf is taken as the number of bytes of traf, denoted by BufLen. The utf8 string "mfhd" is converted into a byte array, which is spliced with the BufLen of bytes generated in a little-end manner and then spliced with the Buf. This byte array is denoted by TrafBuf, and the length of the TrafBuf is denoted by TrafBufLen. Thus, the construction of the traf is completed.

The Mfhd bytes are denoted by MfhdBuf, and the length thereof is denoted by MfhdBufLen. The moof box is now constructed. Let MoofBufLen=MfHdBufLen+TrafBufLen, the utf string "moof" is converted into a byte array, which is spliced with bytes MoofBufLen generated at little end, spliced with MfhdBu and then spliced with TrafBuf, thereby obtaining the complete Moof box.

For example, the operation may be performed in accordance with API of the MES standard. That is, a media source is initialized and SourceCache region is created according to the codec packet. Subsequently, moof and mdata are continuously fed to the SourceCache region to obtain the second video stream data.

Figure 8:
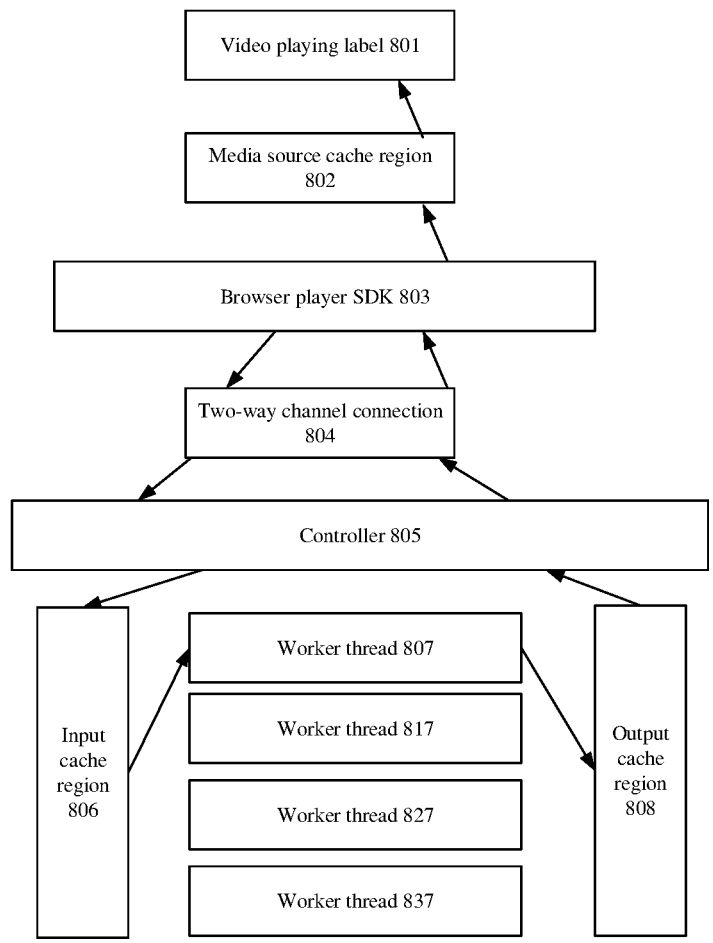
FIG. 8 illustrates a schematic diagram of a system architecture 800 applied to an information processing method provided by at least one embodiment of the present disclosure.

FIG. 8 illustrates a schematic diagram of a system architecture 800 applied to a information processing method provided by at least one embodiment of the present disclosure.

As shown in FIG. 8, the system architecture 800 may include a video playing label 801, a media source cache region 802, a browser player SDK 803, a two-way channel connection 804, a controller 805, an input cache region 806, a plurality of worker threads 807-837 and an output cache region 808. The video playing label 801, the media source cache region 802 and the browser player SDK 803 are on a client side, and the controller 805, the input cache region 806, the plurality of worker threads 807-837 and the output cache region 808 are on a cloud player side.

In the example of FIG. 8, a plurality of worker threads 807-837 are shown. For example, the plurality of worker threads 807-837 are created by different clients, respectively. The embodiments will be described below by taking the worker thread 807 for example.

The client is in communication with the cloud player through the two-way channel connection 804. The two-way channel connection 804 may be, for example, websocket.

The browser player SDK 803 is configured to, for example, be responsible for collecting first video stream data and transmitting the first video stream data to the cloud player through the websocket in accordance with a specified format (e.g., transport stream (TS) or program stream (PS)).

The controller 805 of the cloud player responds to receiving the first video stream data and transmits the first video stream data to the input cache region 806 created in advance.

The controller 805 is responsible for serving as a connecting link between the preceding and the following. When the socket client is connected, the controller 805 may get a connection handle. After the socket client transmits an initialization application, the controller 805 may initialize the memory and create a worker thread. The controller generates a token and generates a key-value pair from the three in a main thread. Simultaneously, the controller monitors thread lock events, delivers a notification to each terminal according to an event, and temporarily pends an input packet/output packet according to a situation of the lock so that the whole system can operate healthily. In addition, the controller 805 may also transmit a message to the worker thread regularly. For example, a thread having no acknowledgment of receipt within a preset period of time may be marked as the zombie thread. For the health of the whole system, the controller may safely clear away the zombie thread and inform a relevant socket handle of releasing resources. Generally, the controller 805 is equivalent to a manager or a supervisor.

The worker thread 807 acquires the first video stream data from the input cache region 806, and encodes and decodes the first video stream data to obtain the second video stream data. The worker thread 807 transmits the second video stream data to the output cache region 808 in sequence.

In some embodiments of the present disclosure, for example, the worker thread 807 includes a ffmpeg SDK. After initialization by a user, the ffmpeg completes the initialization of data and waits for an event indication. At this time, the worker thread 807 may wait for an actual task instruction and responds to the task instruction, and the controller writes the task instruction (e.g., 00 01 3E 72 00 74 00 73 00 70 00 (in which 00 represents the data instruction, and 01 represents the url manner with a url length of 62 bits, followed by rtsp:// . . . )) in the read memory and transmits an event to inform the worker thread 807. After receiving the event, the worker thread starts opening an input stream and generates a target output stream according to an initialization parameter, and mounts the context (pb) of custom IO on the output stream. That is, a pipeline for data to flow out is generated. The pipeline is sliced by an fmp4 slicer to form data packets that can be transmitted to the client. When the write lock is opened, the data packets are compressed into the output cache region 808 for processing by the websocket service. It needs to be noted that wrapping into fmp4 in this embodiment is merely an example. Wrapping into an actually needed format may be realized by a person skilled in the art. The media source extension (MSE) protocol of the browser can be utilized in wrapping into fmp4. Thus, cropped ffmpeg wrapped by the browser can be used to play an audio and video conveniently.

The output cache region 808 transmits the data packet of the second video stream data to the controller 805, and the controller 805 provides the second video stream data to the client through the websocket.

For example, the controller 805 provides the second video stream data to the client through the websocket.

The browser player SDK 803 of the client parses and restores CUSTO data packet to fmp4, and provides the fmp4 to the media source cache region 802. The media source cache region 802 provides the fmp4 to the video playing label 801 so that the video playing label 801 plays the second video stream data. The video playing label 801 is, for example, H5<video>.

Therefore, in the example of FIG. 8, the mode that the websocket, the controller and the worker thread are combined is abbreviated as SCW mode in the present disclosure. The SCW mode, as a custom mode for communication of the websocket application layer, is used for two-way notification of a streaming message, thread scheduling management and the like.

Figure 9:
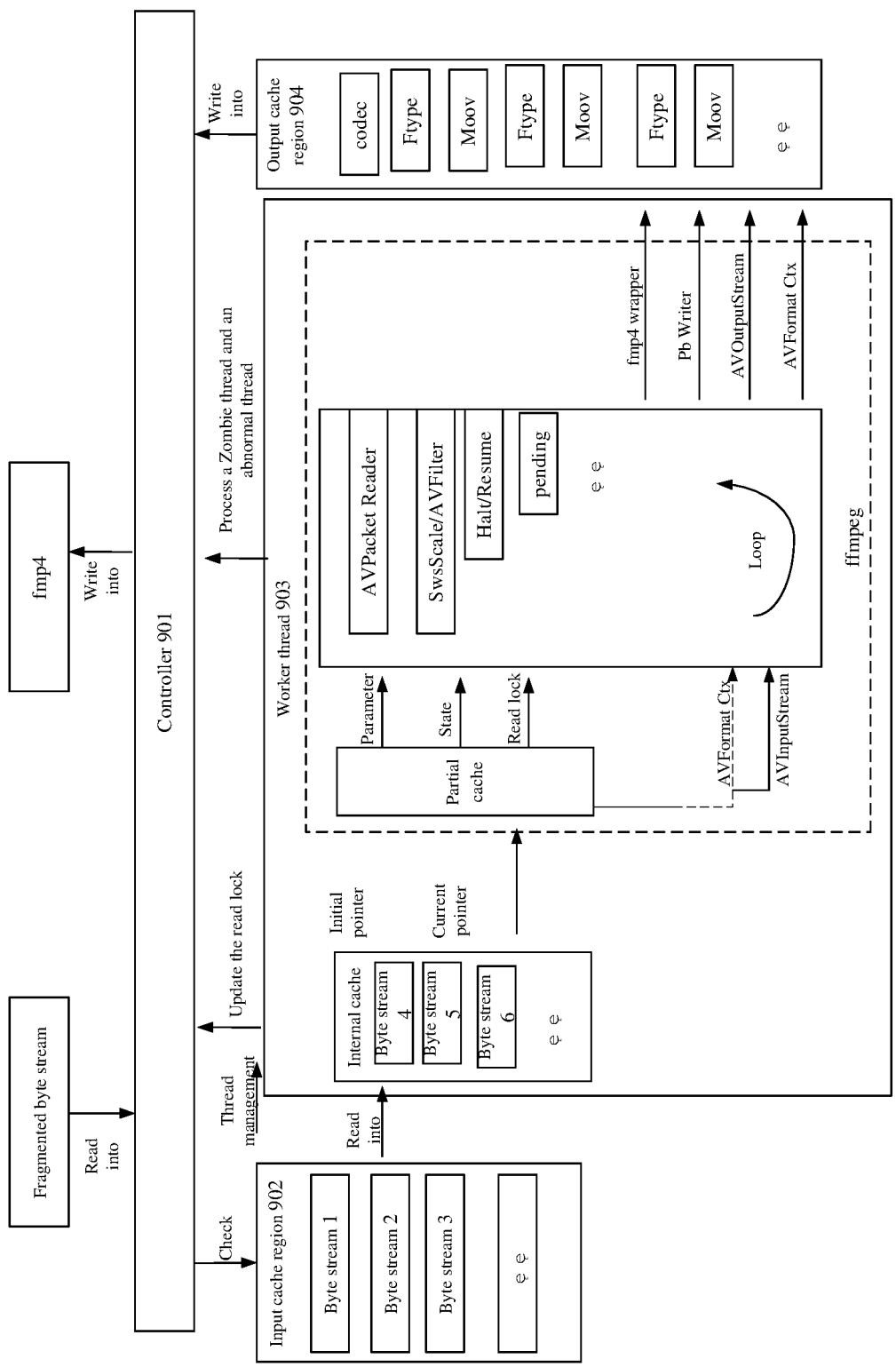
FIG. 9 illustrates a schematic diagram of a server architecture 900 applied to an information processing method provided by at least one embodiment of the present disclosure.

FIG. 9 illustrates a schematic diagram of a server architecture 900 applied to a information processing method provided by at least one embodiment of the present disclosure.

As shown in FIG. 9, the server architecture includes a controller 901, an input cache region 902, a worker thread 903 and an output cache region 904.

For example, after a fragmented byte stream is read by the controller 901, the controller checks the fragmented byte stream on protocol, token and the like and provides the fragmented byte stream passing the check to the input cache region 902.

An internal cache of the worker thread 903 continuously reads byte streams from the input cache region 902 and stores the byte streams in a processing queue of the internal cache. For example, the processing queue of the internal cache includes a byte stream 4, a byte stream 5 and a byte stream 6.

In some embodiments of the present disclosure, the internal cache may be a ring memory, which is provided with two pointers. One of the two pointers is an initial pointer indicating a starting point of the ring memory, and the other one is a current pointer indicating a location of a byte stream needing to be read currently. If a cache space between the initial pointer and the current pointer is capable of accommodating a byte stream read from the input cache region, the byte stream is stored in the cache space.

A partial cache of the worker thread 903 reads a byte stream from the processing queue of the internal cache so as to encode and decode the byte stream. For example, data is read from the partial cache by using a callback function of avio of AVFormatCtx according to a play parameter, a read lock and a state, thereby obtaining object AVInputStream and a corresponding parameter. Subsequently, the AVInputStream data is continuously read by using an ffmpeg SDK and decoded by the ffmpeg SDK.

For example, an input stream is read by using the object AVPacket Reader in the ffmpeg SDK and then subjected to processing (e.g., filtering or picture zooming) by the object SwsScale/AVFilter, and the ffmpeg SDK uses Halt/Resume to deal with affairs such as pause and recovery, and operations such as controlling pending of encoding and decoding.

An output stream obtained by encoding and decoding with the ffmpeg SDK passes through the object AVFormat Ctx to form AVOutputStream. After the AVOutputStream is regularized by the object PbWriter and converted into the fmp4 format by the object fmp4 wrapper, a video stream in the fmp4 format is written in the output cache region 904. The ffmpeg SDK cyclically utilizes the objects such as AVPacket Reader, SwsScale/AVFilter, Halt/Resume and pending to process each byte stream.

As shown in FIG. 9, a first byte from the output cache region 904 is the above-mentioned codec packet containing the encoding information, which has been specifically described above. Bytes following the first byte from the output cache region 904 are an fmp4 data packet, which may include, for example, an Ftype data packet and an Moov data packet. The Ftype is used for recoding a file type, and the Moov is used for recording basic play information such as a frame rate.

The output cache region 904 writes the video stream in the fmp4 format in the controller, and the controller provides the fmp4 to a client.

In an embodiment of the present disclosure, in the case of a two-way data channel, handshake security, uplink security and downlink security are involved. The handshake part is symmetric or asymmetric encryption of WSS. The downlink security represents security of data transmitted from the cloud to the client. Here, it refers in particular to that data cannot be reused. That is, any third party cannot decode the video stream without making a request to the cloud. In the embodiment of the present disclosure, in order not to affect the efficiency, a hybrid encoding mode is used. That is, in case of a packet containing a key frame, the moof box is wrapped as the wild card box, or otherwise transmitted normally. The wild card box contains essential data information, but is in a different format and is used for key frame generation in coordination with a terminal. The format may be seen in the appendix. Due to the particularity of the key frame, if there is lack of the key frame for other reference frames, screen blurring may be caused. Because of relying on the client, this part is present in the form of a pluggable plug-in here, i.e., configurable.

The uplink security represents security of data uploaded from the client to the cloud. Here, it refers in particular to that data cannot be operated. That is, any third party cannot access data of a terminal without requesting a token from the terminal In the example of FIG. 9, the controller 901 is further configured to perform thread management on the worker thread 903.

Figure 10:
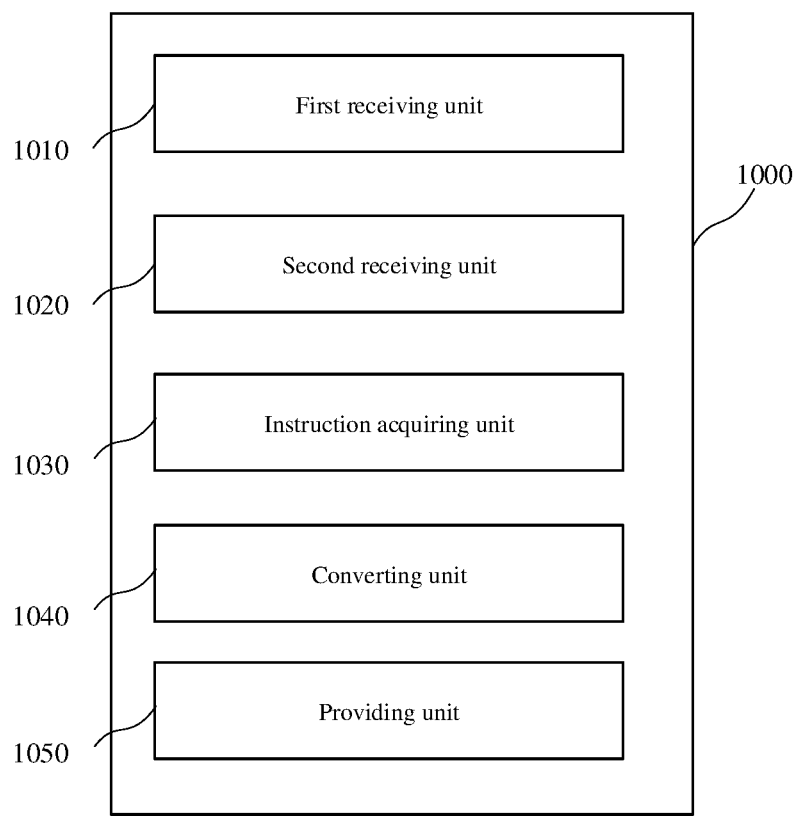
FIG. 10 illustrates a schematic block diagram of an apparatus 1000 for processing information provided by at least one embodiment of the present disclosure.

FIG. 10 illustrates a schematic block diagram of an information processing apparatus 1000 provided by at least one embodiment of the present disclosure.

For example, as shown in FIG. 10, the information processing apparatus 1000 includes a first receiving unit 1010, a second receiving unit 1020, an instruction acquiring unit 1030, a converting unit 1040 and a providing unit 1050.

The first receiving unit 1010 is configured to receive a first initialization application from a first client and respond to the first initialization application, wherein the first initialization application includes a play parameter of video stream data playable on the first client.

The first receiving unit 1010 may perform, for example, step S10 described in FIG. 2.

The second receiving unit 1020 is configured to receive a task instruction from the first client after responding to the first initialization application.

The second receiving unit 1020 may perform, for example, step S20 described in FIG. 2.

The instruction acquiring unit 1030 is configured to acquire first video stream data according to the task instruction.

The instruction acquiring unit 1030 may perform, for example, step S30 described in FIG. 2.

The converting unit 1040 is configured to convert the first video stream data into second video stream data such that the second video stream data has the play parameter.

The converting unit 1040 may perform, for example, step S40 described in FIG. 2.

The providing unit 1050 is configured to provide the second video stream data to the first client so that the second video stream data is played on the first client.

The providing unit 1050 may perform, for example, step S50 described in FIG. 2.

Figure 11:
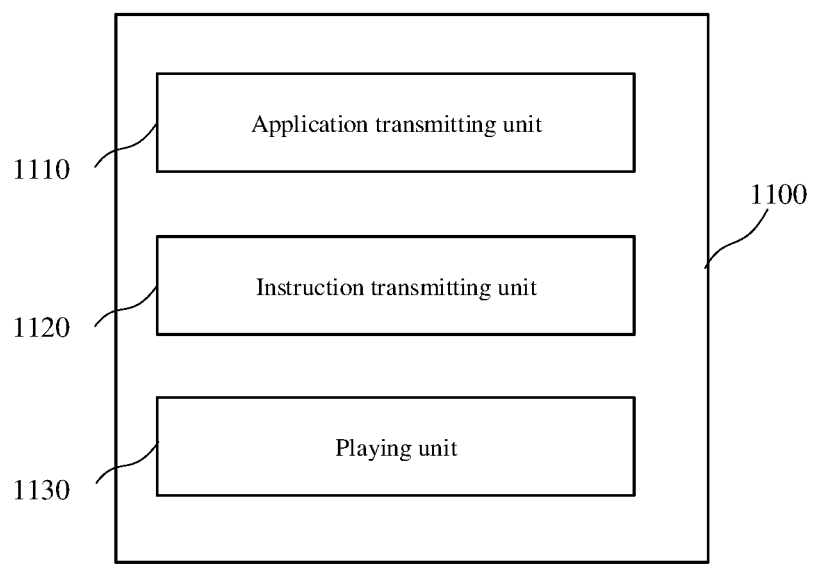
FIG. 11 illustrates a schematic block diagram of another apparatus 1000 for processing information provided by at least one embodiment of the present disclosure.

FIG. 11 illustrates a schematic block diagram of another information processing apparatus 1100 provided by at least one embodiment of the present disclosure.

For example, as shown in FIG. 11, the information processing apparatus 1100 includes an application transmitting unit 1110, an instruction transmitting unit 1120 and a playing unit 1130.

The application transmitting unit 1110 is configured to transmit an initialization application to a server, wherein the initialization application includes a play parameter of playable video stream data.

The application transmitting unit 1110 may perform, for example, step S710 described in FIG. 7.

The instruction transmitting unit 1120 is configured to transmit a task instruction to the server after the server responds to the initialization application.

The instruction transmitting unit 1120 may perform, for example, step S720 described in FIG. 7.

The playing unit 1130 is configured to receive second video stream data provided by the server and play the second video stream data, wherein the second video stream data is obtained by converting, by the server, first video stream data acquired according to the task instruction.

The playing unit 1130 may perform, for example, step S730 described in FIG. 7.

For example, the first receiving unit 1010, the second receiving unit 1020, the instruction acquiring unit 1030, the converting unit 1040 and the providing unit 1050, as well as the application transmitting unit 1110, the instruction transmitting unit 1120 and the playing unit 1130 may be hardware, software, firmware and any feasible combination thereof. For example, the first receiving unit 1010, the second receiving unit 1020, the instruction acquiring unit 1030, the converting unit 1040 and the providing unit 1050, as well as the application transmitting unit 1110, the instruction transmitting unit 1120 and the playing unit 1130 may be special purpose or general purpose circuits, chips or apparatuses, and may also be a combination of a processor and a memory. The embodiments of the present disclosure have no particular limitation on the specific implementation form of each unit described above.

It needs to be noted that, in the embodiments of the present disclosure, the units of the information processing apparatus 1000 or the information processing apparatus 1100 correspond to the steps of the information processing method described above. Specific functions of the information processing apparatus 1000 or the information processing apparatus 1100 may be known with reference to the related description regarding the information processing method, which will not be described here redundantly. The components and structures of the information processing apparatus 1000 shown in FIG. 10 and the information processing apparatus 1100 shown in FIG. 11 are merely exemplary and non-limiting. As needed, the information processing apparatus 1000 or the information processing apparatus 1100 may further include other components and structures.

At least one embodiment of the present disclosure further provides an electronic device. The electronic device includes a processor, and a memory including one or more computer program modules. One or more computer program modules are stored in the memory and configured to be executed by the processor. One or more computer program modules include instructions for implementing the information processing method described above. The electronic device may allow a server to encode and decode an audio and video to be played on a first client. Thus, the audio and video playing requirements of most terminals can be met by the computing power provided by strong software/hardware of a cloud (i.e., the server), and a cloud player is realized. The problem of being difficult in playing an audio and video in the complex encoding and decoding context is solved.

Figure 12:
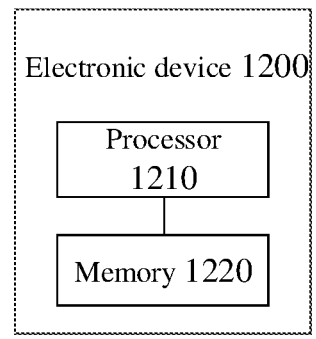
FIG. 12 illustrates a schematic block diagram of an electronic device provided by at least one embodiment of the present disclosure.

FIG. 12A is a schematic block diagram of an electronic device provided by some embodiments of the present disclosure. As shown in FIG. 12A, the electronic device 1200 includes one or more processors 1210 and a memory 1220. The memory 1220 is configured to store non-transient computer readable instructions (e.g., one or more computer program modules). The processor 1210 is configured to run the non-transient computer readable instructions. The non-transient computer readable instructions may, when run by the processor 1210, implement one or more steps of the information processing method described above. The memory 1220 and the processor 1210 may be interconnected by means of a bus system and/or a connection mechanism in other form (not shown).

For example, the processor 1210 may be a central processing unit (CPU), a graphics processing unit (GPU) or a processing unit in other form having data processing capability and/or program executing capability. For example, the CPU may be an X86 or ARM architecture or the like. The processor 1210 may be a general purpose processor or a special purpose processor and may control other components in the electronic device 1200 to perform desired functions.

For example, the memory 1220 may include any combination of one or more computer program products. The computer program products may include computer readable storage mediums in various forms, e.g., a volatile memory and/or a nonvolatile memory. The volatile memory may include, for example, a random access memory (RAM) and/or a cache, etc. The nonvolatile memory may include, for example, a read only memory (ROM), a hard disk, an erasable programmable read-only memory (EPROM), a compact disk read-only memory (CD-ROM), a USB memory, a flash memory, etc. One or more computer program modules may be stored on the computer readable storage medium, and the processor 1210 may run the one or more computer program modules to realize various functions of the electronic device 1200. Various APPs and various kinds of data as well as various kinds of data used and/or generated by APPs and the like may also be stored on the computer readable storage medium.

It needs to be noted that in the embodiments of the present disclosure, the specific functions and the technical effects of the electronic device 1200 may be known with reference to the above description regarding the information processing method, which will not be described here redundantly.

Figure 13:
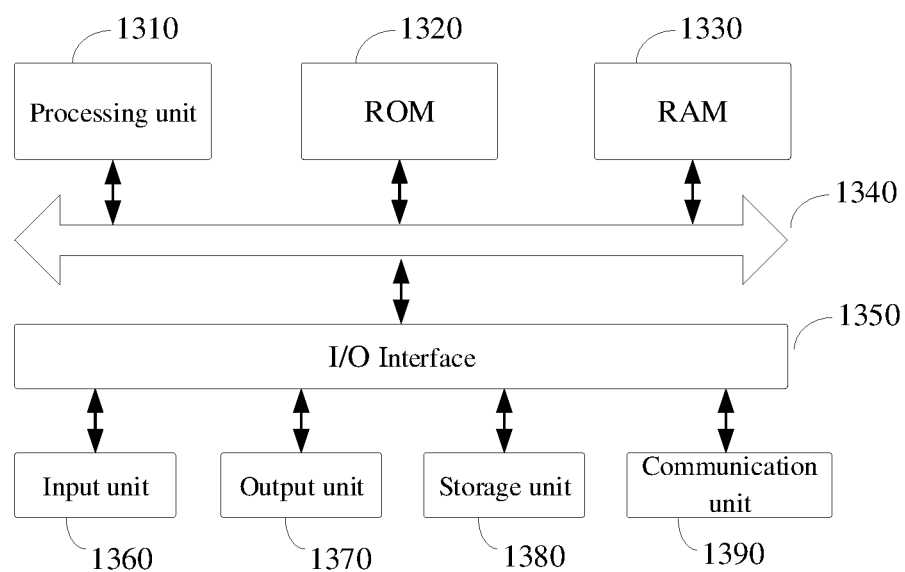
FIG. 13 illustrates a schematic block diagram of another electronic device provided by at least one embodiment of the present disclosure.

FIG. 13 is a schematic block diagram of another electronic device provided by some embodiments of the present disclosure. For example, the electronic device 1300 is adapted to implement the information processing method provided by the embodiments of the present disclosure. The electronic device 1300 may be a terminal device and the like. It needs to be noted that the electronic device 1300 shown in FIG. 13 is merely an example and would not pose any limitation on the functions and the range of use of the embodiments of the present disclosure.

As shown in FIG. 13, the electronic device 1300 may include a processing unit (e.g., a CPU or a GPU) 1310, which can perform various suitable actions and processing according to a program stored on an ROM 1320 or a program loaded from a storage unit 1380 into an RAM 1330. On the RAM 1330, various programs and data required by operations of the electronic device 1300 are also stored. The processing unit 1310, the ROM 1320 and the RAM 1330 are connected to one another by means of a bus 1340. An input/output (I/O) interface 1350 is also connected to the bus 1340.

Usually, the following units may be connected to the I/O interface 1350: an input unit 1360 including, for example, a touch screen, a touch pad, a keyboard, a mouse, a camera, a microphone, an accelerometer and a gyroscope; an output unit 1370 including, for example, a liquid crystal display (LCD), a loudspeaker and a vibrator; a storage unit 1380 including, for example, a magnetic tape and a hard disk; and a communication unit 1390. The communication unit 1390 may allow the electronic device 1300 to be in wireless or wired communication with other electronic devices to exchange data. While FIG. 13 illustrates the electronic device 1300 having various units, it is to be understood that all the illustrated units are not necessarily implemented or included. The electronic device 1300 may alternatively implement or have more or less units.

For example, according to the embodiments of the present disclosure, the information processing method described above may be implemented as a computer software program. For example, an embodiment of the present disclosure provides a computer program product, which includes a computer program carried on a non-transient computer readable medium. The computer program includes a program code for carrying out the information processing method described above. In such an embodiment, the computer program may be downloaded online through a communication unit 1390 and installed, or installed from a storage unit 1380, or installed from an ROM 1320. When the computer program is executed by a processing unit 1310, the functions defined in the information processing method provided by the embodiments of the present disclosure may be realized.

At least one embodiment of the present disclosure further provides a computer readable storage medium for storing non-transient computer readable instructions. The non-transient computer readable instructions may, when executed by a computer, implement the information processing method described above. With the computer readable storage medium, an audio and video to be played on a first client is encoded and decoded by a server. Thus, the audio and video playing requirements of most terminals can be met by the computing power provided by strong software/hardware of a cloud (i.e., the server), and a cloud player is realized. The problem of being difficult in playing an audio and video in the context of complex encoding and decoding is solved.

Figure 14:
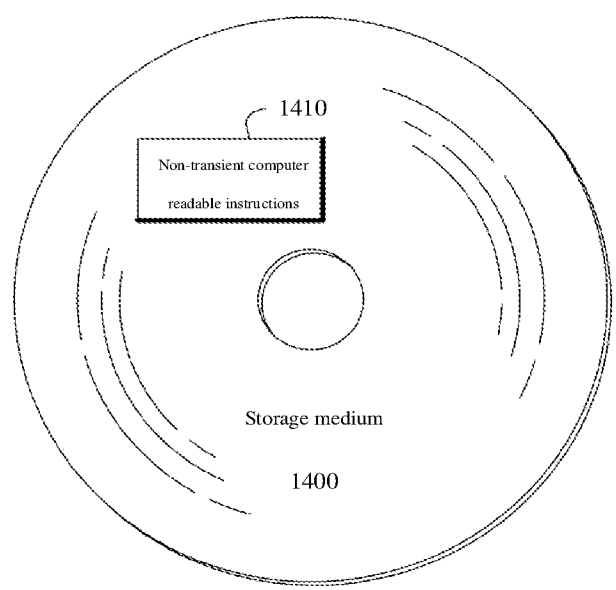
FIG. 14 illustrates a schematic diagram of a computer readable storage medium provided by at least one embodiment of the present disclosure.

FIG. 14 is a schematic diagram of a storage medium provided by some embodiments of the present disclosure. As shown in FIG. 14, The memory medium 1400 is configured to store non-transient computer readable instructions 1410 provided in some embodiments. For example, when the non-transient computer readable instructions 1410 are executed by a computer, one or more steps of the information processing method described above may be carried out.

For example, the storage medium 1400 may be applied to the electronic device 1200 described above. For example, the storage medium 1400 may be the memory 1220 in the electronic device 1200 shown in FIG. 12. For example, the related description regarding the storage medium 1400 may be known with reference to the corresponding description of the memory 820 in the electronic device 1200 shown in FIG. 12, which will not be described here redundantly.

The following statements should be noted for the present disclosure:

(1) The accompanying drawings involve only the structure(s) in connection with the embodiment(s) of the present disclosure, and other structure(s) can be referred to common design(s); and (2) In case of no conflict, features in one embodiment or in different embodiments can be combined.

What are described above is related to the illustrative embodiments of the disclosure only and not limitative to the scope of the disclosure; the scopes of the disclosure are defined by the accompanying claims.

What is claimed is:

1. An information processing method, comprising:
    receiving a first initialization application from a first client and responding to the first initialization application, wherein the first initialization application comprises a play parameter of video stream data playable on the first client;
    receiving a task instruction from the first client after responding to the first initialization application;
    acquiring first video stream data according to the task instruction;
    converting the first video stream data into second video stream data such that the second video stream data has the play parameter; and
    providing the second video stream data to the first client so that the second video stream data is played on the first client;
    wherein receiving the first initialization application from the first client and responding to the first initialization application comprise:
        receiving the first initialization application from the first client; and
        responding to the first initialization application, creating a worker thread, and enabling an input cache region and an output cache region for the worker thread,
        wherein the input cache region is configured to store the first video stream data; the worker thread is configured to acquire the first video stream data from the input cache region and process the first video stream data to obtain the second video stream data; and the output cache region is configured to receive the second video stream data provided by the worker thread and provide the second video stream data to the first client; and
    wherein converting the first video stream data into the second video stream data such that the second video stream data has the play parameter comprises:
        reading, by the worker thread, the first video stream data from the input cache region, and storing the first video stream data in a processing queue of the worker thread; and
        decoding and encoding, by the worker thread, the first video stream data in the processing queue according to the play parameter to obtain the second video stream data.

2. The information processing method according to claim 1, wherein acquiring the first video stream data according to the task instruction comprises:
    determining an acquisition manner for acquiring the first video stream data according to the task instruction and acquiring the first video stream data according to the acquisition manner.

3. The method according to claim 2, wherein determining the acquisition manner for acquiring the first video stream data according to the task instruction and acquiring the first video stream data according to the acquisition manner comprise:
    indicating the acquisition manner as a uniform resource locator (url) manner in response to the task instruction and acquiring a url from the task instruction;
    acquiring the first video stream data according to the url; and
    storing the first video stream data in the input cache region.

4. The information processing method according to claim 2, wherein determining the acquisition manner for acquiring the first video stream data according to the task instruction and acquiring the first video stream data according to the acquisition manner comprises:
    indicating the acquisition manner as a cache region manner in response to the task instruction and extracting the first video stream data from the task instruction; and
    storing the first video stream data in the input cache region.

5. The information processing method according to claim 1, wherein the worker thread comprises a read lock which is triggered when the input cache region is full, and
    the worker thread stops reading the first video stream data from the input cache region in response to the read lock being triggered;
    the worker thread further comprises a write lock which is triggered when the output cache region is full, and
    the worker thread stops writing the second video stream data in the output cache region and stops reading the first video stream data from the input cache region in response to the write lock being triggered.

6. The information processing method according to claim 1, further comprising:
    acquiring a read speed at which the first video stream data is read into the input cache region;
    acquiring a transcoding speed at which the worker thread converts the first video stream data into the second video stream data;
    acquiring a write speed at which the output cache region outputs the second video stream data; and
    determining whether the transcoding speed is greater than the write speed and whether the write speed is greater than the read speed; and
    adjusting the read speed, the transcoding speed and the write speed in response to the read speed, the transcoding speed and the write speed not satisfying that the transcoding speed is greater than the write speed and that the write speed is greater than the read speed.

7. The information processing method according to claim 6, wherein a transcoding bit rate is divided into a plurality of encoding layers with transcoding bit rates decreasing sequentially, and
    adjusting the read speed, the transcoding speed and the write speed in response to the read speed, the transcoding speed and the write speed not satisfying that the transcoding speed is greater than the write speed and that the write speed is greater than the read speed comprises:
        adjusting the transcoding bit rate to a transcoding bit rate corresponding to an encoding layer next to a current encoding layer starting from next key frame of the first video stream data, in response to the transcoding speed being smaller than the write speed.

8. The information processing method according to claim 1, further comprising:
acquiring a player instruction from the first client; and
controlling a playing state of the second video stream data on the first client according to the player instruction.

9. The method according to claim 1, further comprising:
establishing a two-way data channel with the first client before receiving the first initialization application from the first client; and
after responding to the first initialization application, establishing a correspondence among the two-way data channel, the output cache region, the input cache region, verification information and the worker thread so as to allow for interaction with the first client according to the correspondence.

10. The information processing method according to claim 9, further comprising:
in response to receiving a second initialization application provided by a second client, acquiring information to be verified from the second initialization application; and
in response to the information to be verified being consistent with the verification information, acquiring an output cache region corresponding to the verification information according to the correspondence, and providing the second video stream data from the output cache region to the second client.

11. The information processing method according to claim 1, wherein decoding and encoding, by the worker thread, the first video stream data in the processing queue according to the play parameter to obtain the second video stream data comprise:
loading, by the worker thread, the first video stream data in the processing queue to an encoder-decoder; and
decoding and encoding, by the encoder-decoder, the first video stream data to obtain the second video stream data.

12. An information processing method, comprising:
receiving a first initialization application from a first client and responding to the first initialization application, wherein the first initialization application comprises a play parameter of video stream data playable on the first client;
receiving a task instruction from the first client after responding to the first initialization application;
acquiring first video stream data according to the task instruction;
converting the first video stream data into second video stream data such that the second video stream data has the play parameter; and
providing the second video stream data to the first client so that the second video stream data is played on the first client,
wherein receiving the first initialization application from the first client and responding to the first initialization application comprise:
receiving the first initialization application from the first client; and
responding to the first initialization application, creating a worker thread, and enabling an input cache region and an output cache region for the worker thread,
wherein the input cache region is configured to store the first video stream data; the worker thread is configured to acquire the first video stream data from the input cache region and process the first video stream data to obtain the second video stream data; and the output cache region is configured to receive the second video stream data provided by the worker thread and provide the second video stream data to the first client; and
wherein acquiring the first video stream data according to the task instruction comprises:
determining an acquisition manner for acquiring the first video stream data according to the task instruction and acquiring the first video stream data according to the acquisition manner, comprising:
indicating the acquisition manner as a fragmented byte stream manner in response to the task instruction, and sequentially receiving a plurality of task subinstructions provided from the first client, wherein the plurality of task subinstructions comprise different video stream data parts of the first video stream data, respectively; and
sequentially extracting the video stream data parts of the first video stream data from the plurality of task subinstructions, and storing the video stream data parts in the input cache region.

13. An information processing method, comprising:
receiving a first initialization application from a first client and responding to the first initialization application, wherein the first initialization application comprises a play parameter of video stream data playable on the first client;
receiving a task instruction from the first client after responding to the first initialization application;
acquiring first video stream data according to the task instruction;
converting the first video stream data into second video stream data such that the second video stream data has the play parameter; and
providing the second video stream data to the first client so that the second video stream data is played on the first client,
wherein receiving the first initialization application from the first client and responding to the first initialization application comprise:
receiving the first initialization application from the first client; and
responding to the first initialization application, creating a worker thread, and enabling an input cache region and an output cache region for the worker thread,
wherein the input cache region is configured to store the first video stream data; the worker thread is configured to acquire the first video stream data from the input cache region and process the first video stream data to obtain the second video stream data; and the output cache region is configured to receive the second video stream data provided by the worker thread and provide the second video stream data to the first client; and
wherein providing the second video stream data to the first client so that the second video stream data is played on the first client comprises:
generating encoding information according to an encoding operation performed by the worker thread on the first video stream data;
storing the encoding information at a head of a queue of the output cache region such that a first data packet output from the output cache region contains the encoding information;

writing the second video stream data into the output cache region; and sequentially providing a plurality of data packets from the output cache region to the first client, wherein the plurality of data packets comprise the encoding information and the second video stream data.

14. The information processing method according to claim 13, wherein writing the second video stream data into the output cache region comprises:

wrapping basic play information of a key frame in the second video stream data as a wild card box such that the first client parses the wild card box to obtain the basic play information, wherein the wild card box comprises a plurality of randomly generated bytes.

15. An electronic device, comprising:

a processor; and a memory, comprising one or more computer program instructions;

wherein the one or more computer program instructions are stored in the memory and when executed by the processor, implement the information processing method according to claim 1.

16. A non-transitory computer-readable storage medium storing instructions that, when executed by a processor, cause the processor to perform the information processing method according to claim 1.

\* \* \* \* \*